US011048182B2

(12) United States Patent
Hoshino et al.

(10) Patent No.: US 11,048,182 B2
(45) Date of Patent: Jun. 29, 2021

(54) METHOD FOR PRODUCING ARTICLES HAVING A METALLIC LUSTER, AND TONERS WITH A METALLIC LUSTER USING THE SAME AND A PRINTING METHOD USING THE SAME

(71) Applicant: NATIONAL UNIVERSITY CORPORATION CHIBA UNIVERSITY, Chiba (JP)

(72) Inventors: Katsuyoshi Hoshino, Chiba (JP); Terumasa Mitogawa, Chiba (JP); Katsuma Miyamoto, Chiba (JP)

(73) Assignee: NATIONAL UNIVERSITY CORPORATION CHIBA UNIVERSITY

( * ) Notice: Subject to any disclaimer, the term of this patent is extended or adjusted under 35 U.S.C. 154(b) by 218 days.

(21) Appl. No.: 16/305,241

(22) PCT Filed: May 31, 2017

(86) PCT No.: PCT/JP2017/020373
§ 371 (c)(1),
(2) Date: Nov. 28, 2018

(87) PCT Pub. No.: WO2017/209224
PCT Pub. Date: Dec. 7, 2017

(65) Prior Publication Data
US 2020/0319568 A1    Oct. 8, 2020

(30) Foreign Application Priority Data

May 31, 2016   (JP) .................................. 2016-109631
Jul. 11, 2016   (JP) .................................. 2016-136489
Nov. 16, 2016  (JP) ............................. JP2016-223667

(51) Int. Cl.
G03G 9/09       (2006.01)
G03G 15/20      (2006.01)
(Continued)

(52) U.S. Cl.
CPC ................ G03G 9/09 (2013.01); C08J 3/005 (2013.01); C08J 3/12 (2013.01); G03G 15/2092 (2013.01);
(Continued)

(58) Field of Classification Search
CPC ....................................................... G03G 9/09
See application file for complete search history.

(56) References Cited

U.S. PATENT DOCUMENTS

2005/0202251 A1   9/2005  Elschner et al.
2016/0075917 A1*  3/2016  Hoshino ............... C03C 17/009
                                                                524/435

FOREIGN PATENT DOCUMENTS

JP    S6372726 A    4/1988
JP    S6386206 A    4/1988
(Continued)

OTHER PUBLICATIONS

Machine translation of JP2014153691 (Year: 2014).*
International Search Report corresponding to Application No. PCT/JP2017/020373; dated Aug. 29, 2017.

*Primary Examiner* — Walter L Lindsay, Jr.
*Assistant Examiner* — Andrew V Do
(74) *Attorney, Agent, or Firm* — Hayes Soloway P.C.

(57) ABSTRACT

A method for producing an article having a novel metal gloss which does not use a solvent when forming an article having metallic luster, and a toner for metallic luster color and a printing method using the same.

10 Claims, 31 Drawing Sheets

(51) Int. Cl.
*C08J 3/00* (2006.01)
*C08J 3/12* (2006.01)

(52) U.S. Cl.
CPC ........ *C08J 2365/00* (2013.01); *C08J 2467/00* (2013.01)

(56) References Cited

FOREIGN PATENT DOCUMENTS

| | | | |
|---|---|---|---|
| JP | H1088030 A | 4/1998 | |
| JP | 2007529094 A | 10/2007 | |
| JP | 2014153691 A | 8/2014 | |
| WO | WO-2014021405 A2 * | 2/2014 | ............. B05D 5/067 |

* cited by examiner

[Fig.1]
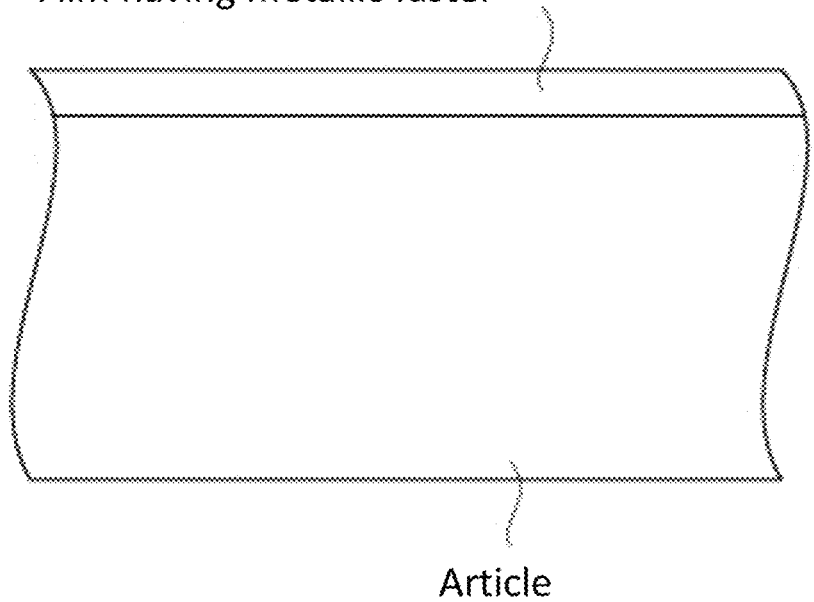
Film having metallic luster
Article
[Fig.2]
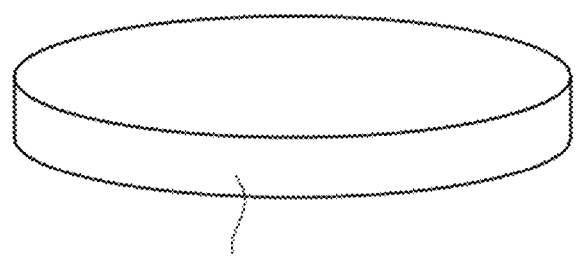
Article with metallic luster

[Fig.3]
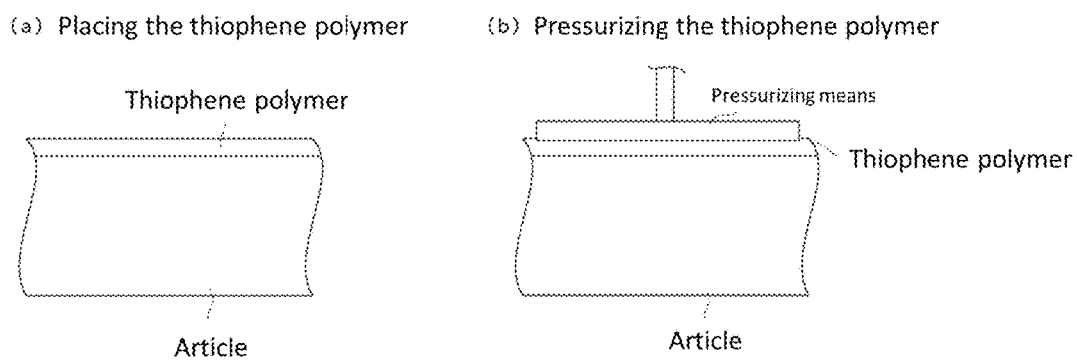
[Fig.4]
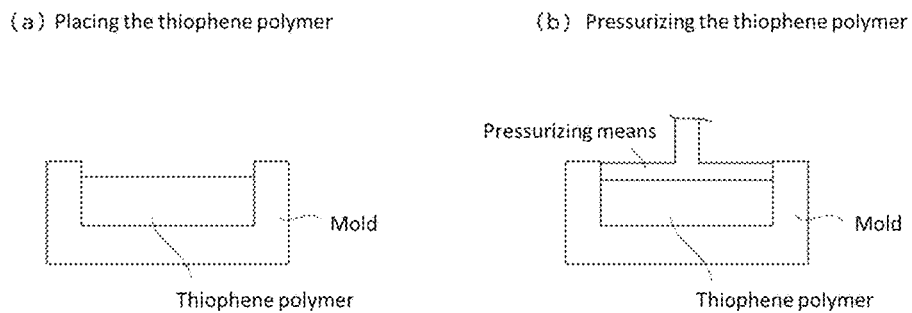

[Fig.5]
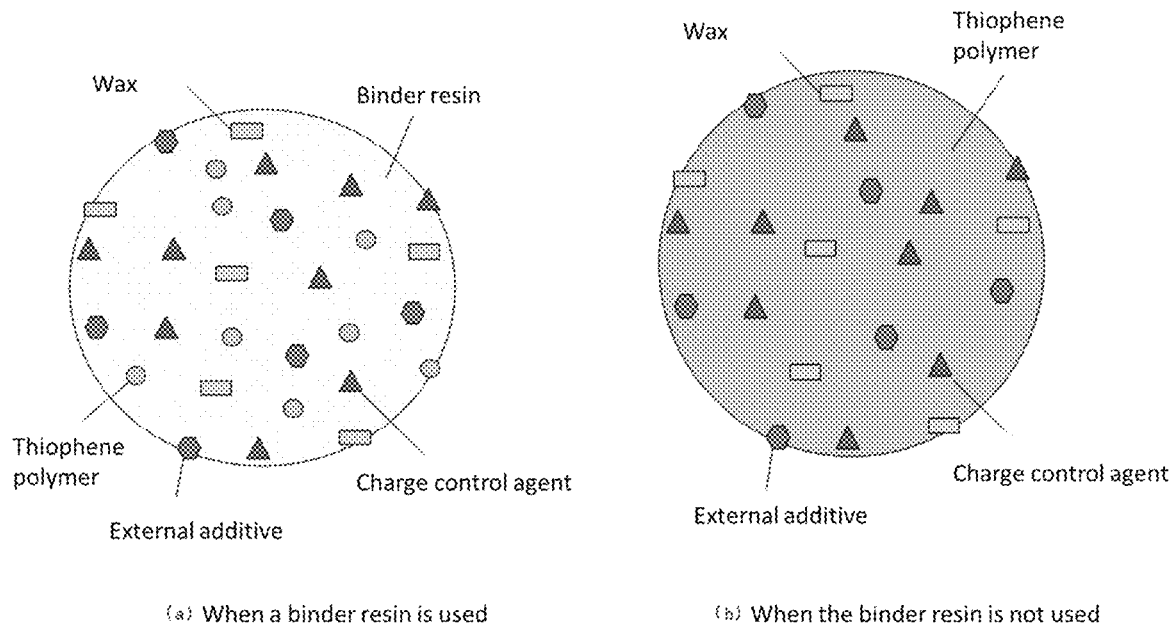
(a) When a binder resin is used
(b) When the binder resin is not used
[Fig.6]
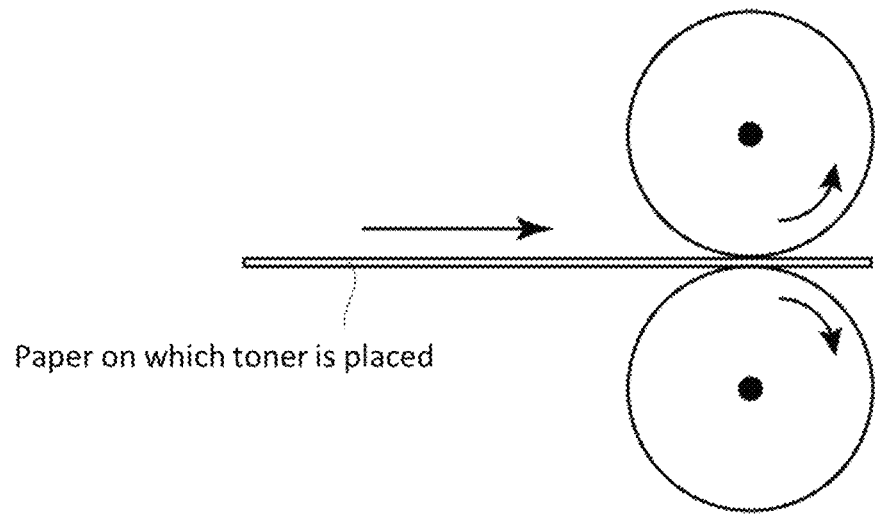

[Fig.7]
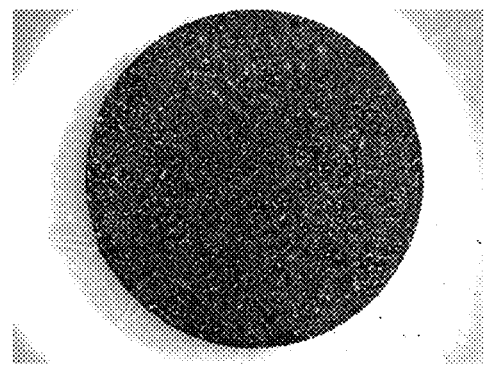 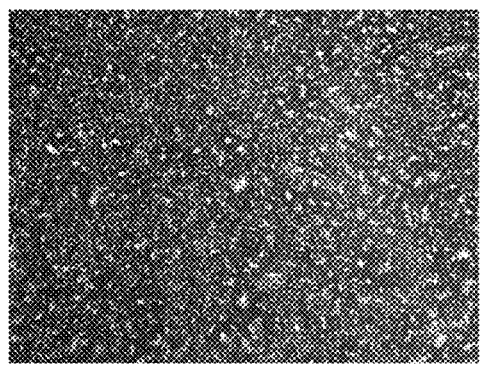
pressure 0.038 ton/cm²
[Fig.8]
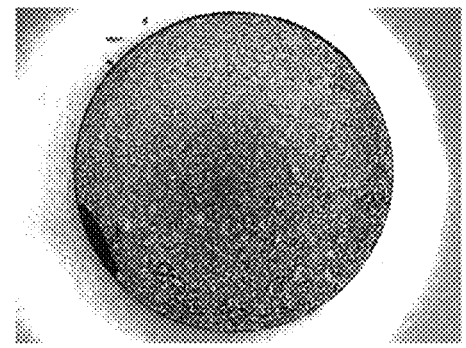 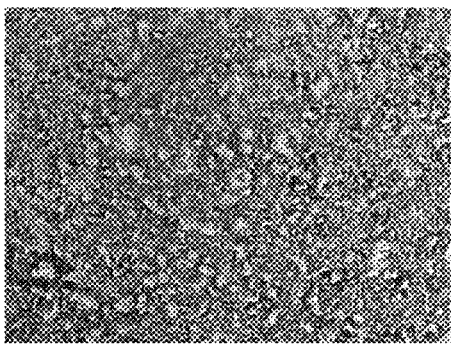
pressure 0.38 ton/cm²
[Fig.9]
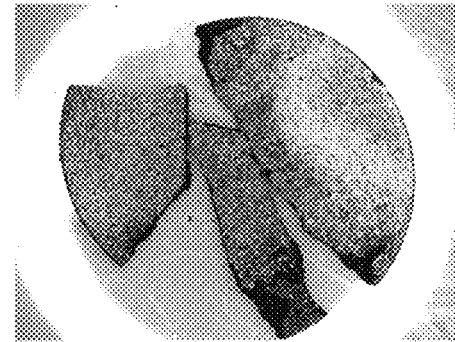 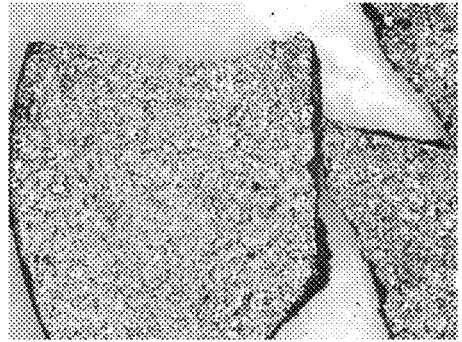
pressure 0.75 ton/cm²

[Fig.10]
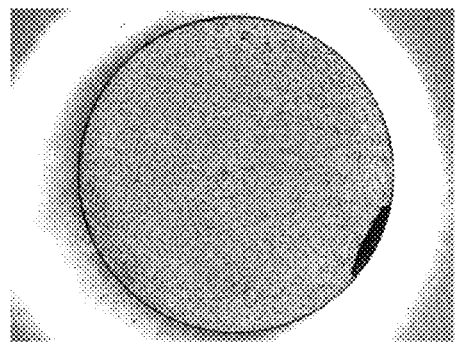 
pressure 1.5 ton/cm²
[Fig.11]
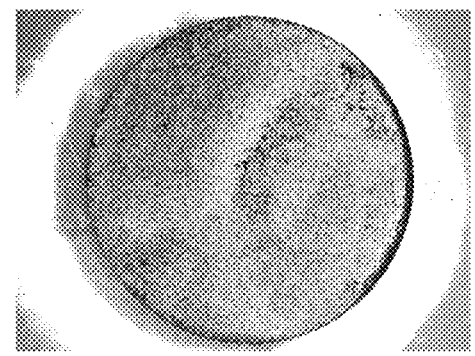 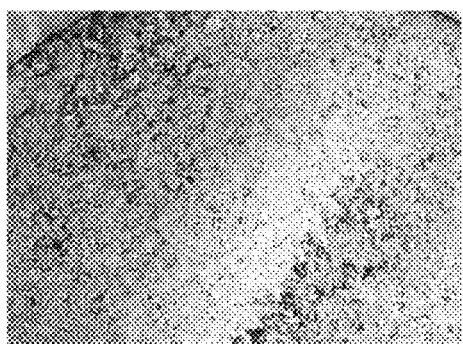
pressure 3.0 ton/cm²
[Fig.12]
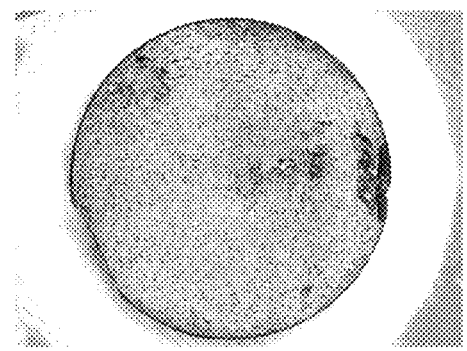 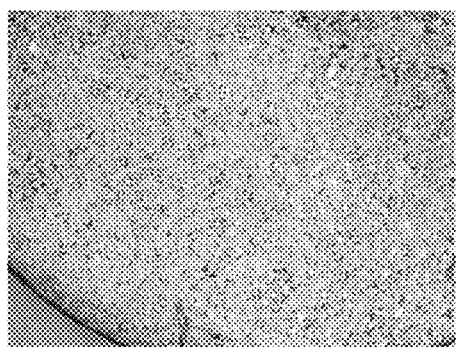
pressure 6.0 ton/cm²

[Fig.13]
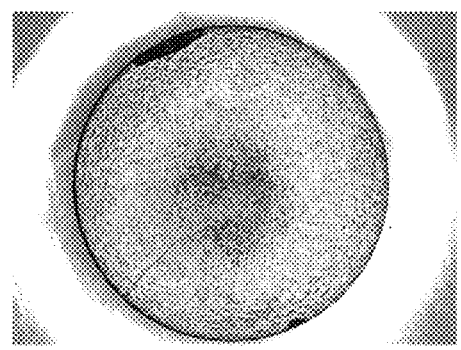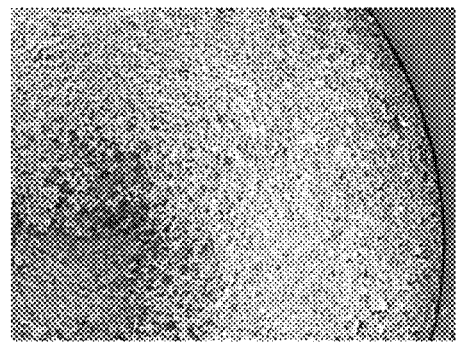
pressure 7.5 ton/cm²

[Fig.14]
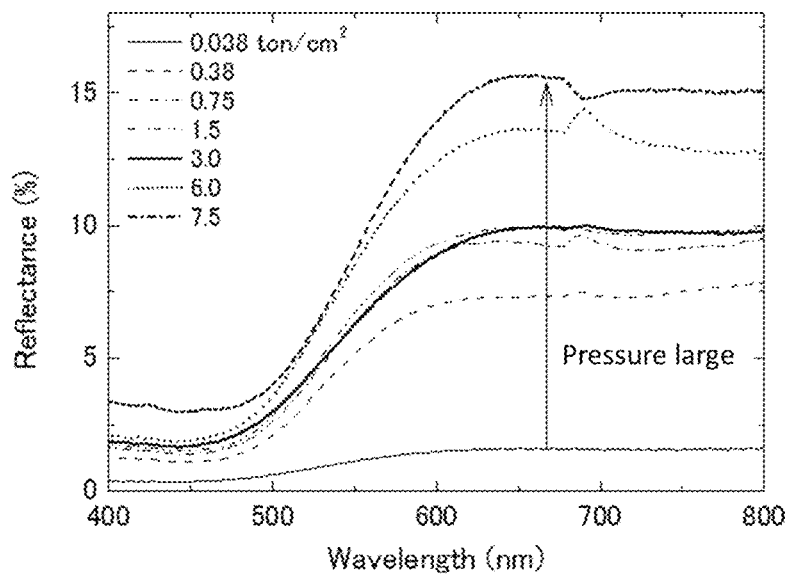
[Fig.15]
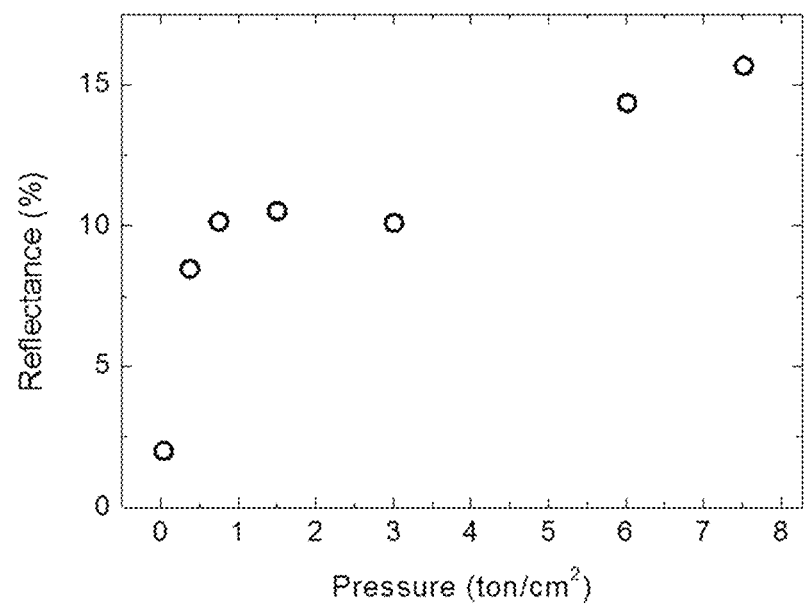

[Fig.16]
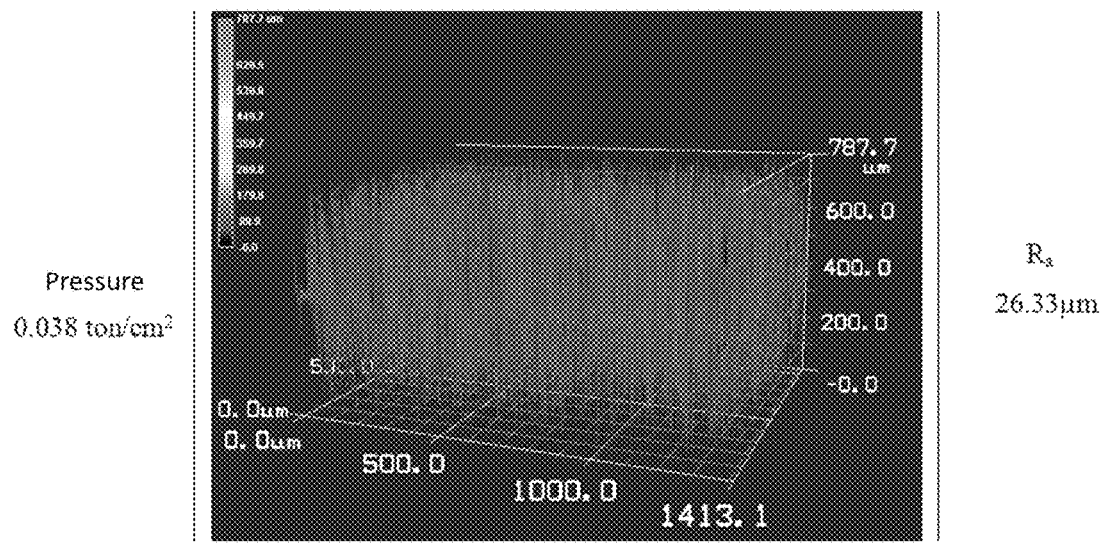
[Fig.17]
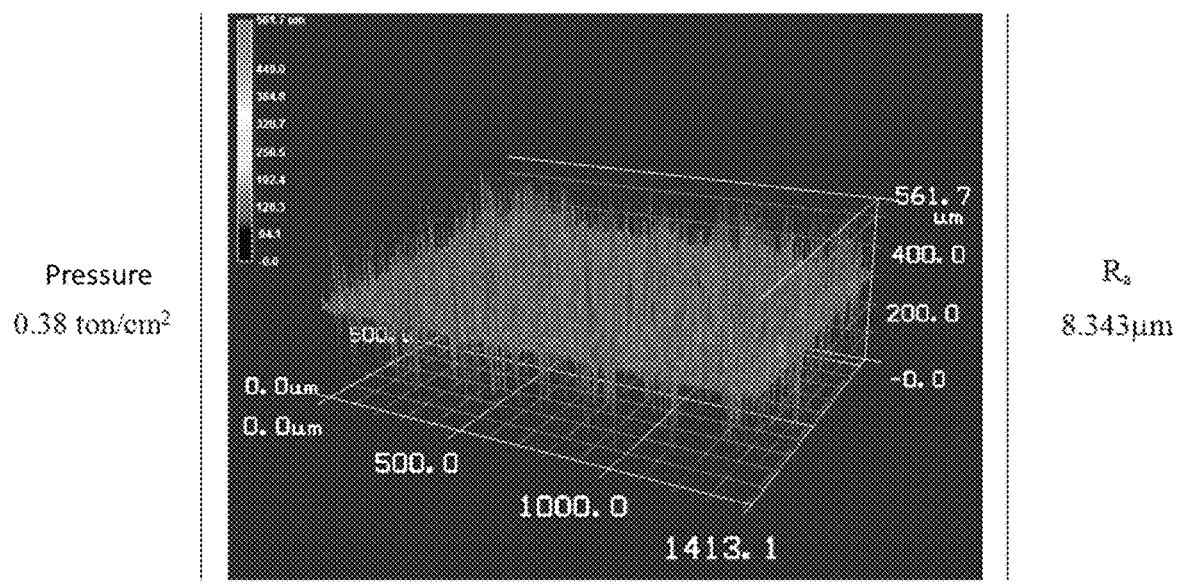

[Fig.18]
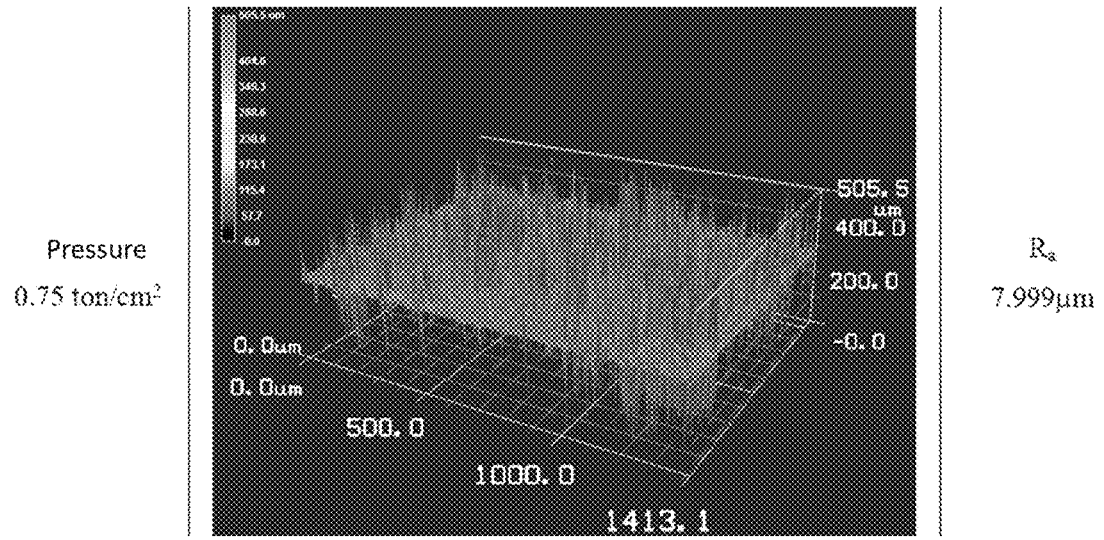
Pressure
0.75 ton/cm²
$R_a$
7.999μm
[Fig.19]
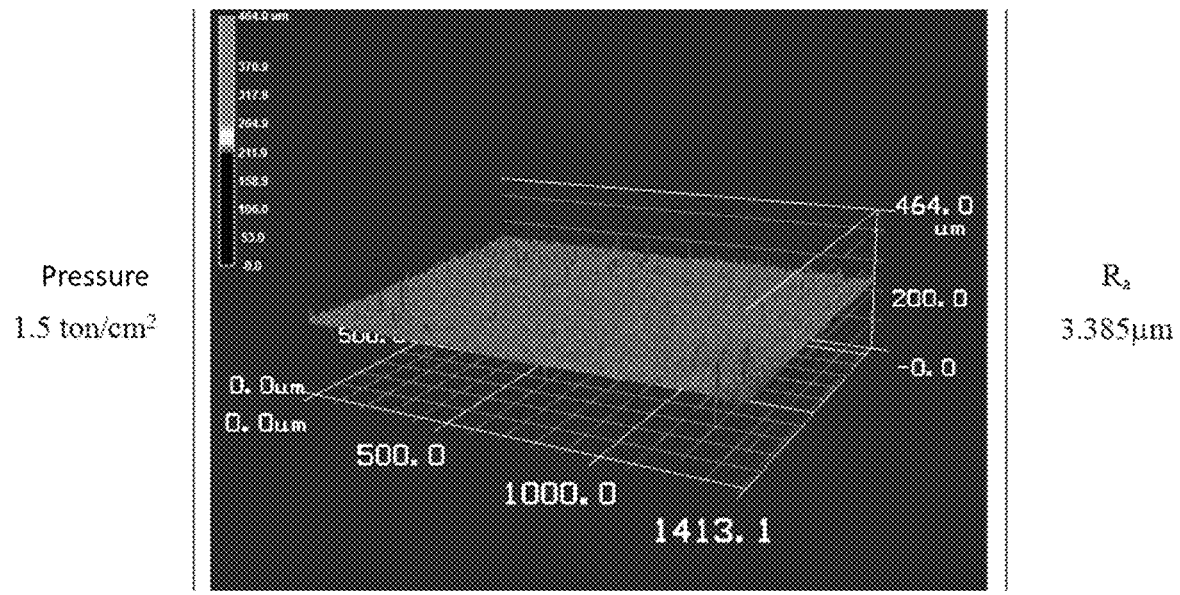
Pressure
1.5 ton/cm²
$R_a$
3.385μm

[Fig.20]
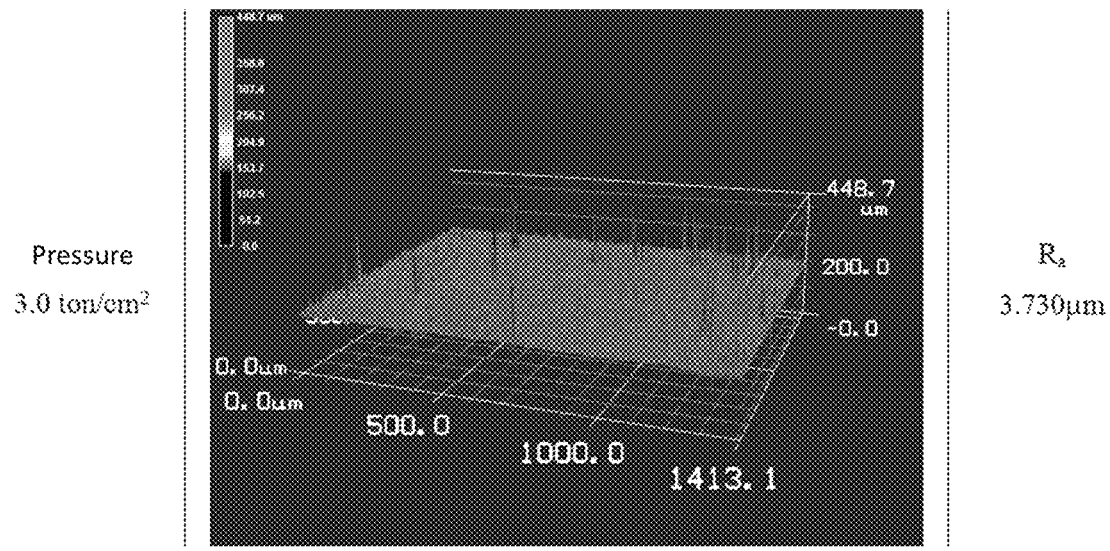
Pressure
3.0 ton/cm²
$R_a$
3.730μm
[Fig.21]
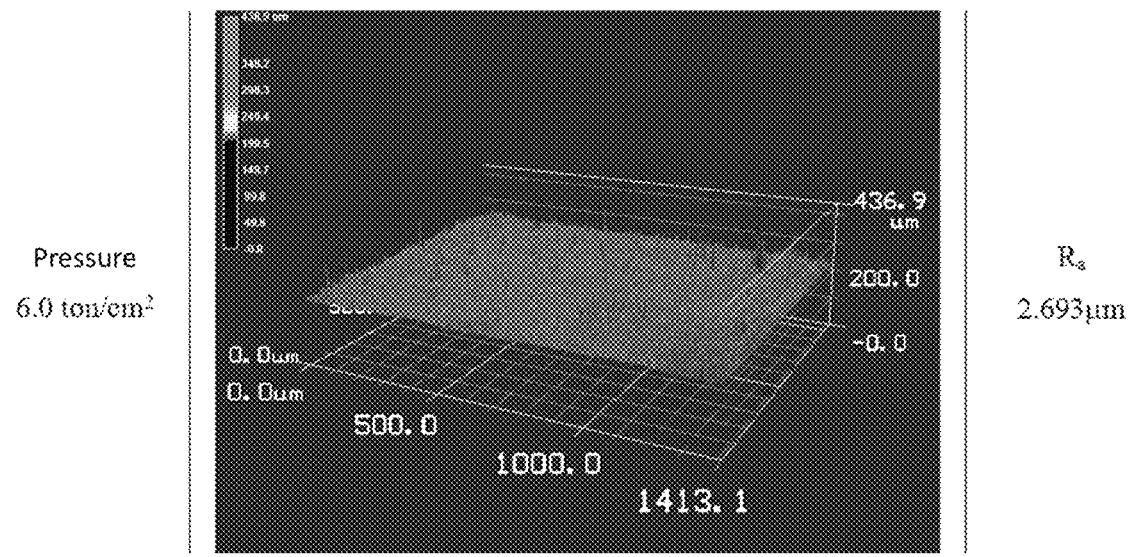
Pressure
6.0 ton/cm²
$R_a$
2.693μm

[Fig.22]
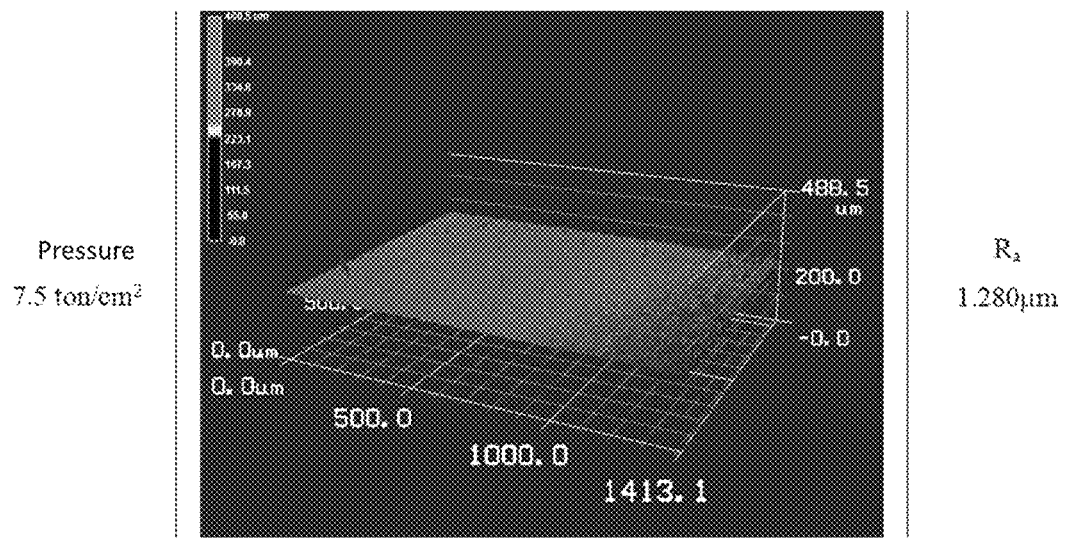
[Fig.23]
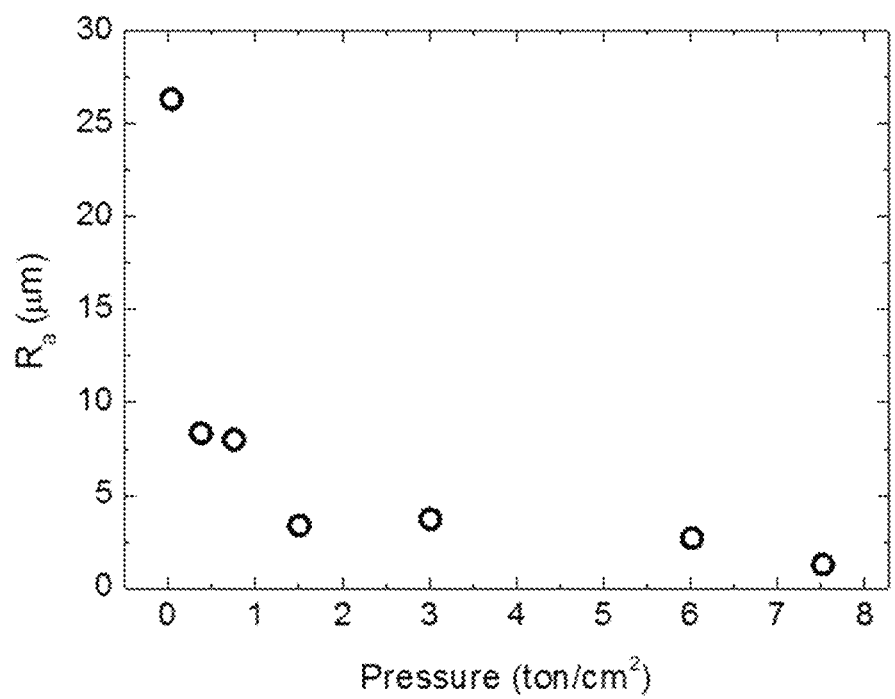

[Fig.24]
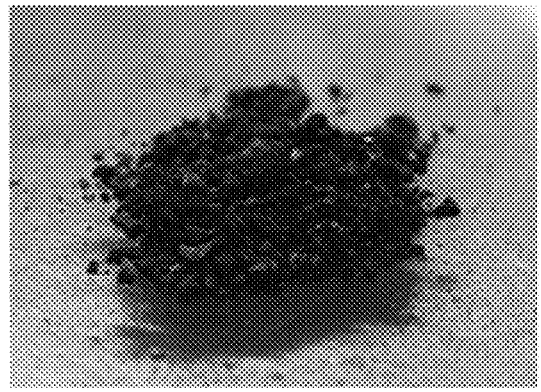
(a) Before rubbing
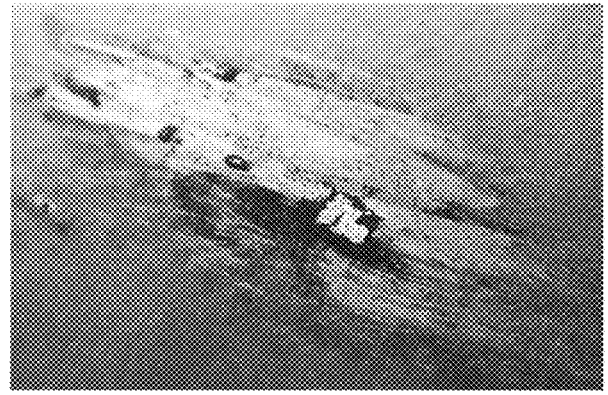
(a) After rubbing
[Fig.25]
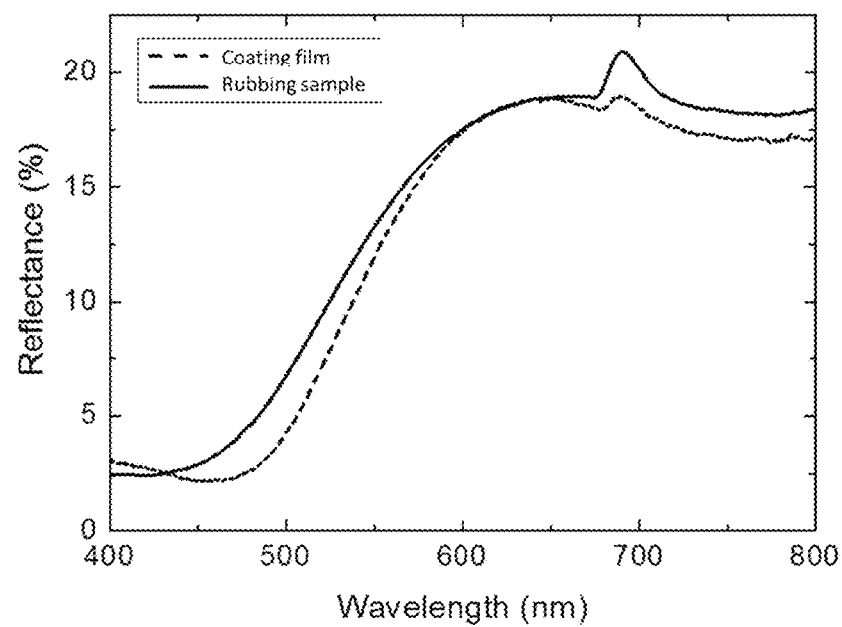

[Fig.26]
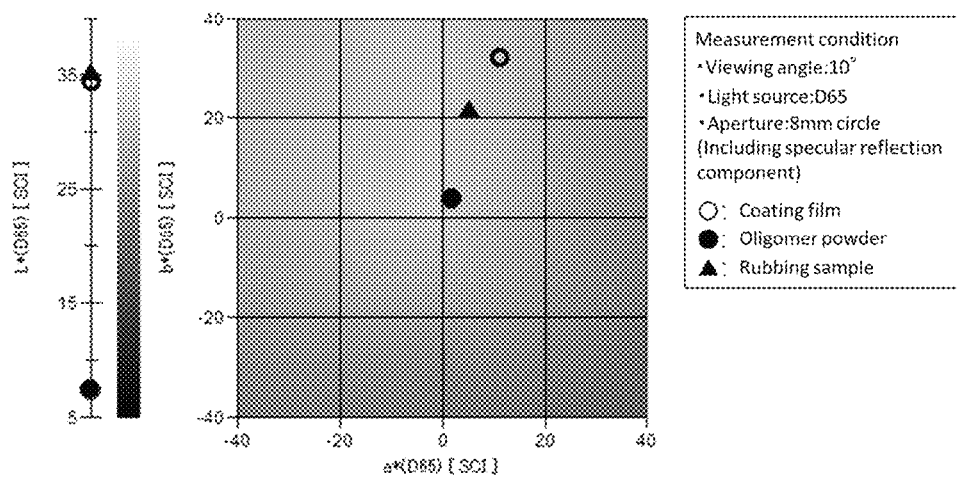
[Fig.27]
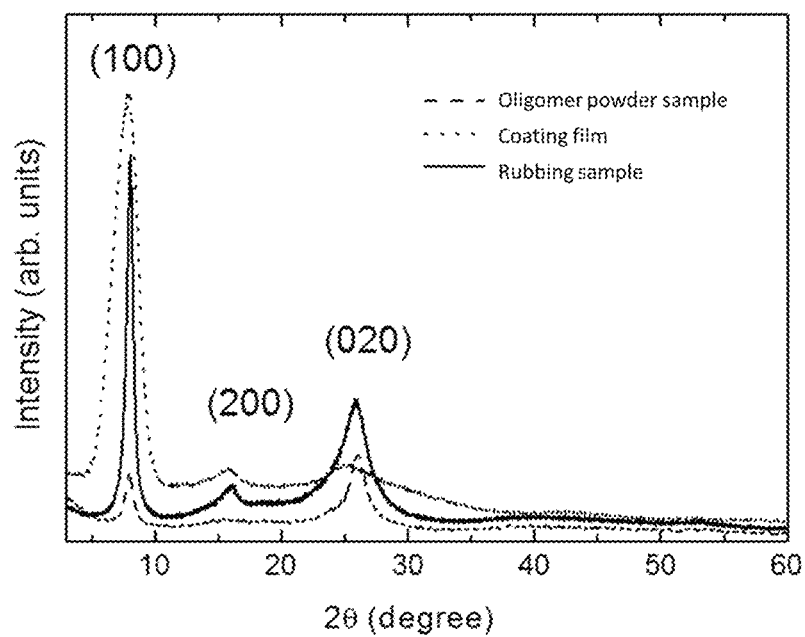

[Fig.28]
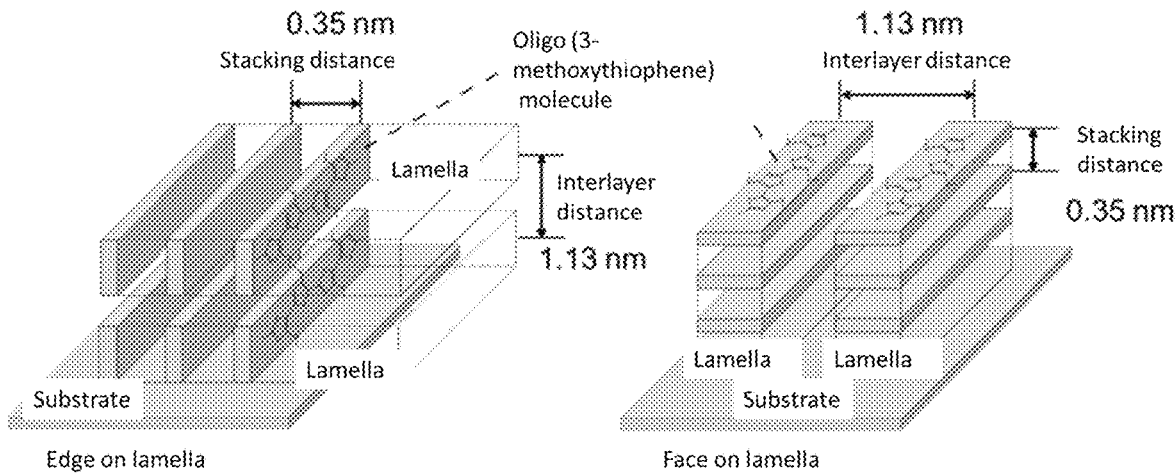
[Fig.29]
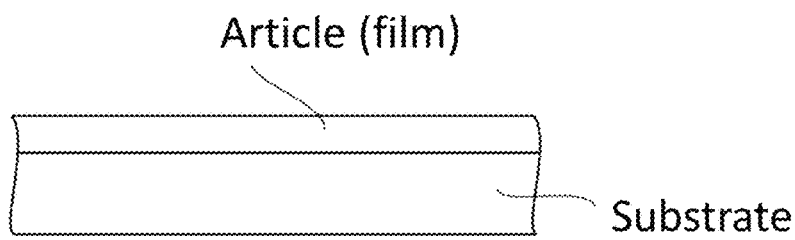
[Fig.30]
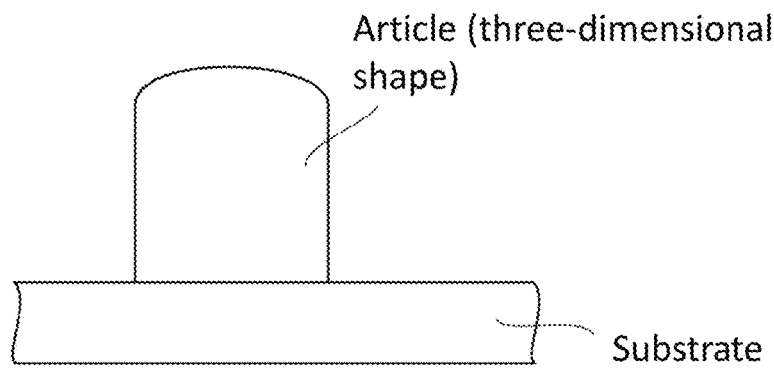

[Fig.31]
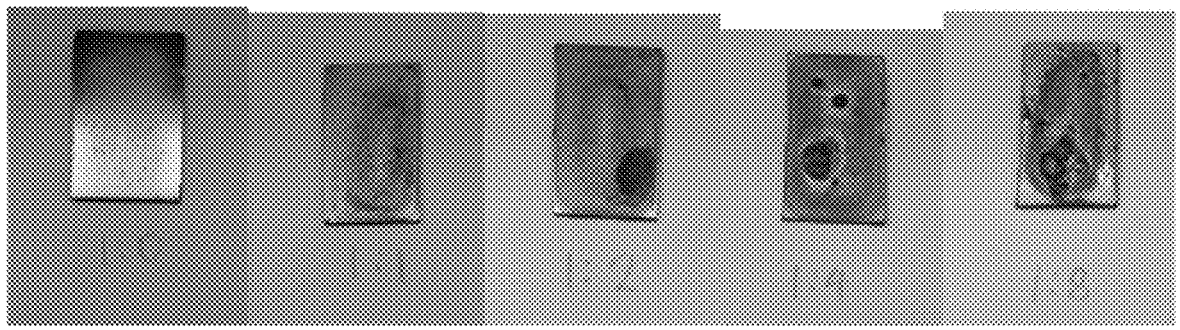
[Fig.32]
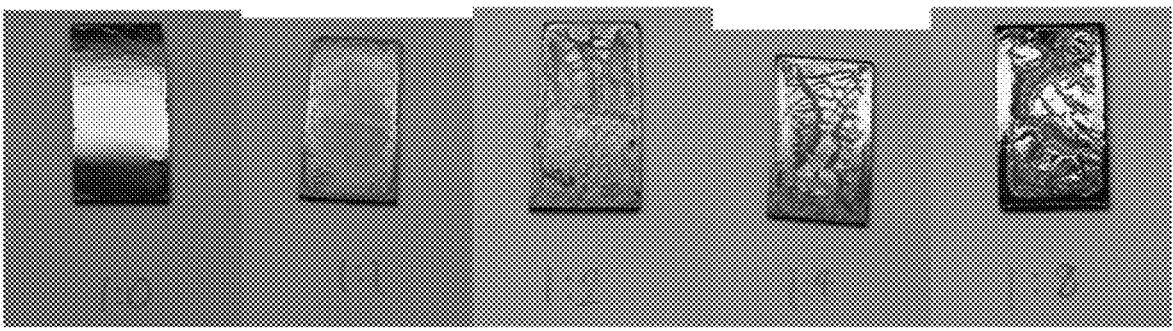

[Fig.33]
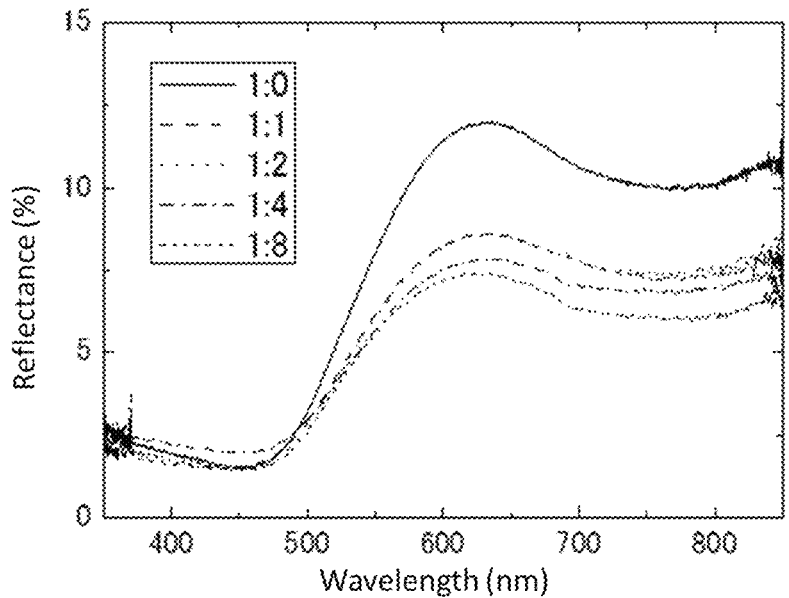
[Fig.34]
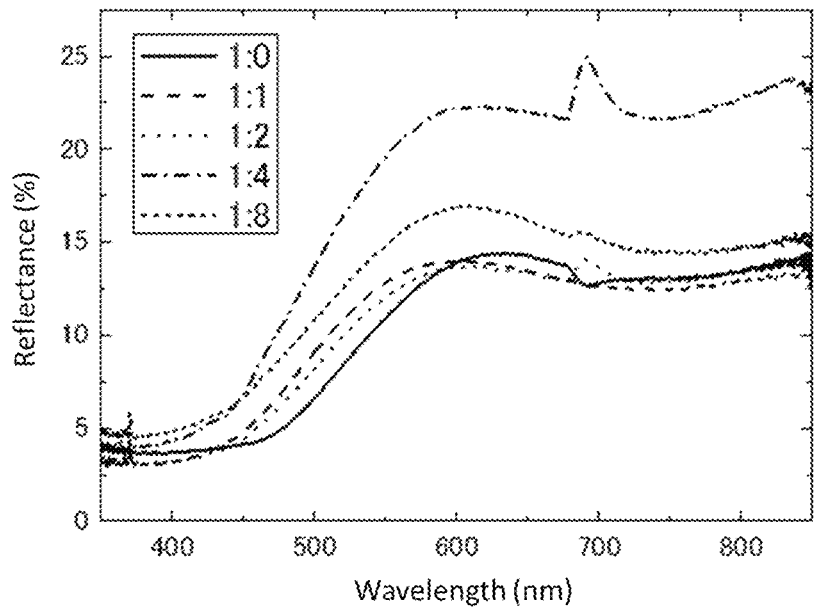

[Fig.35]
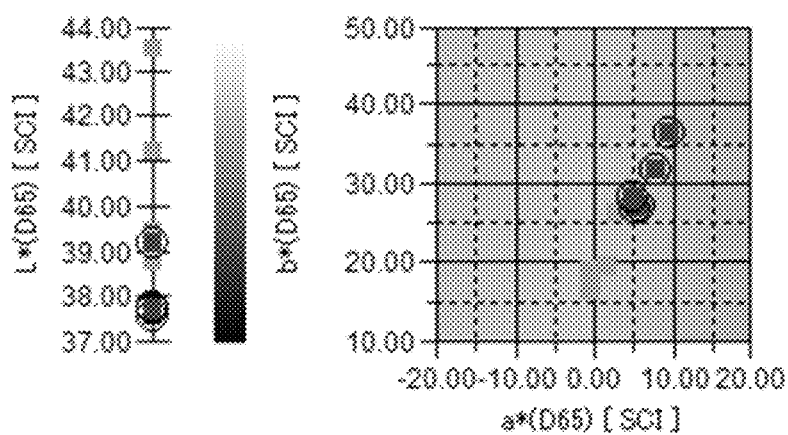
[Fig.36]
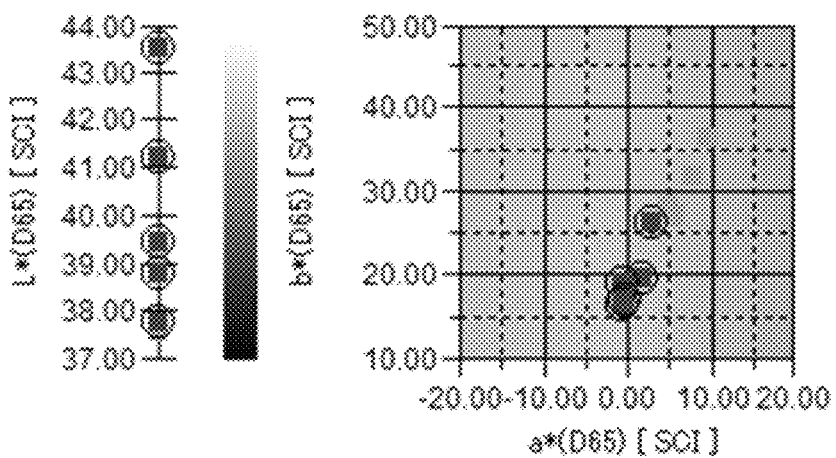

[Fig.37]
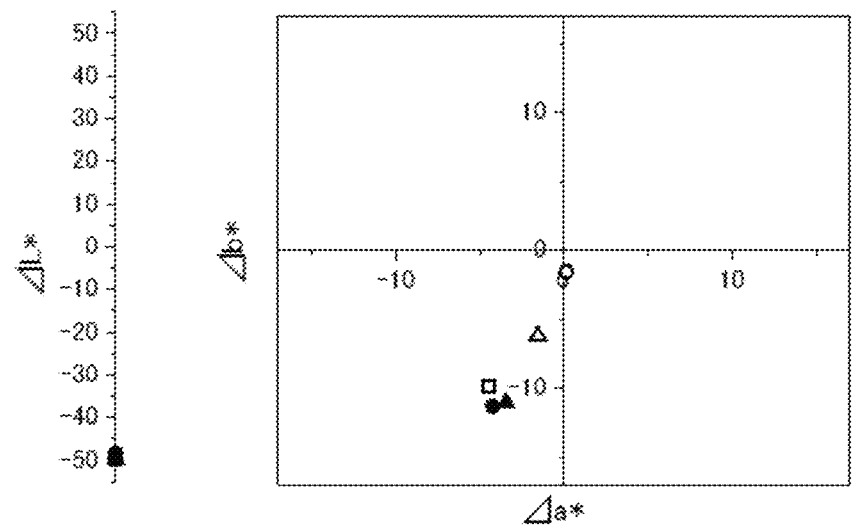
(○ : 1:0, ● : 1:1, △ : 1:2, ▲ : 1:4, □ : 1:8)
[Fig.38]
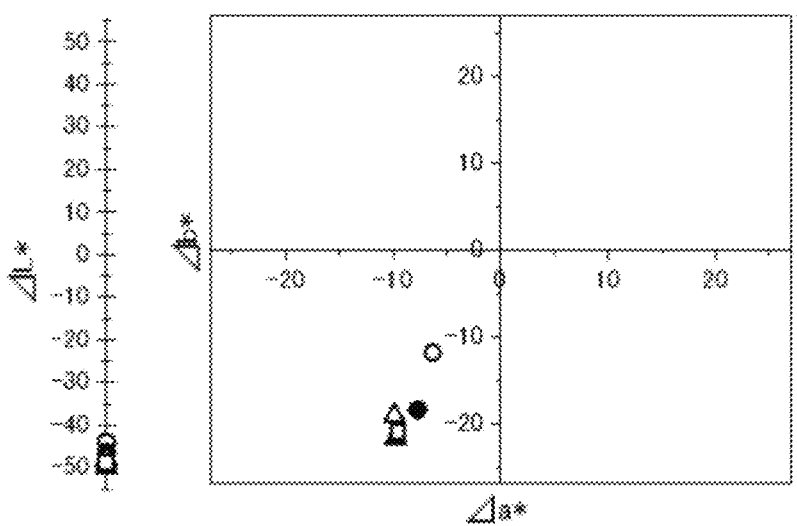
(○ : 1:0, ● : 1:1, △ : 1:2, ▲ : 1:4, □ : 1:8)

[Fig.39]
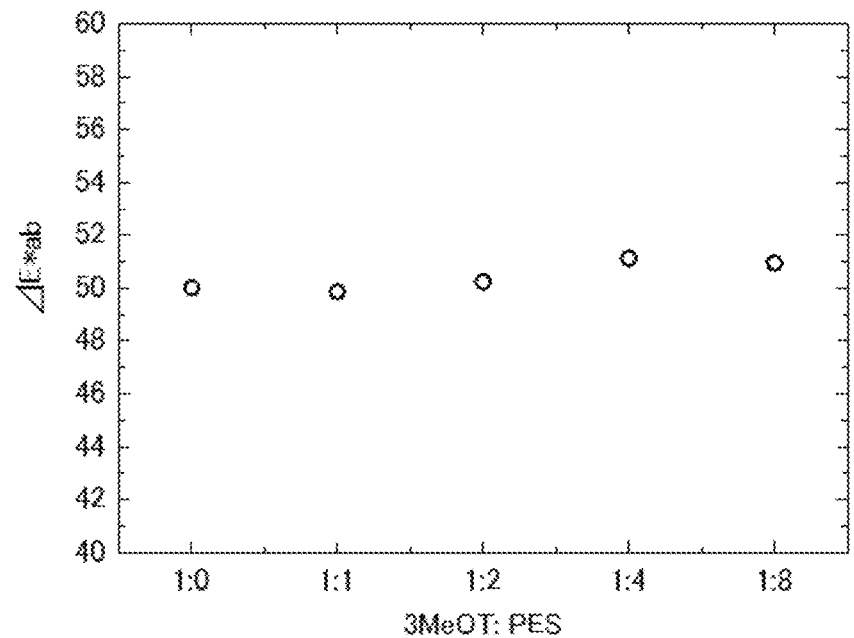
[Fig.40]
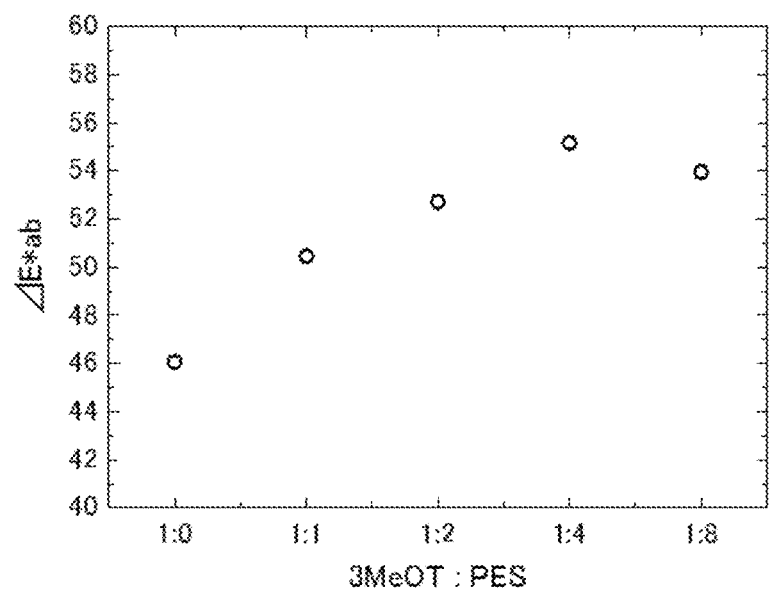

[Fig.41]
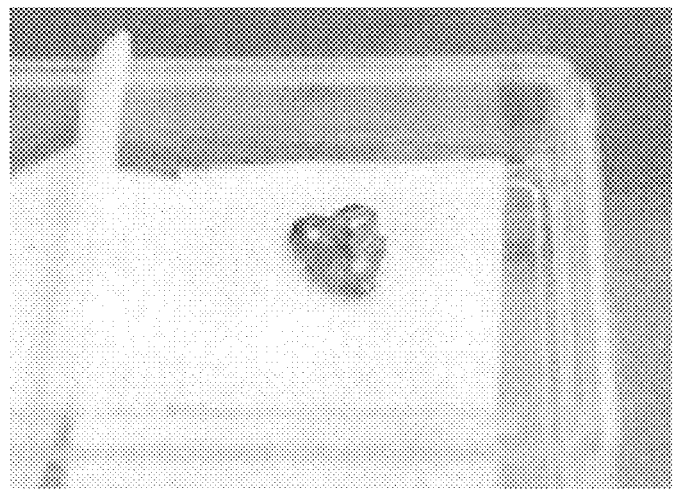
[Fig.42]
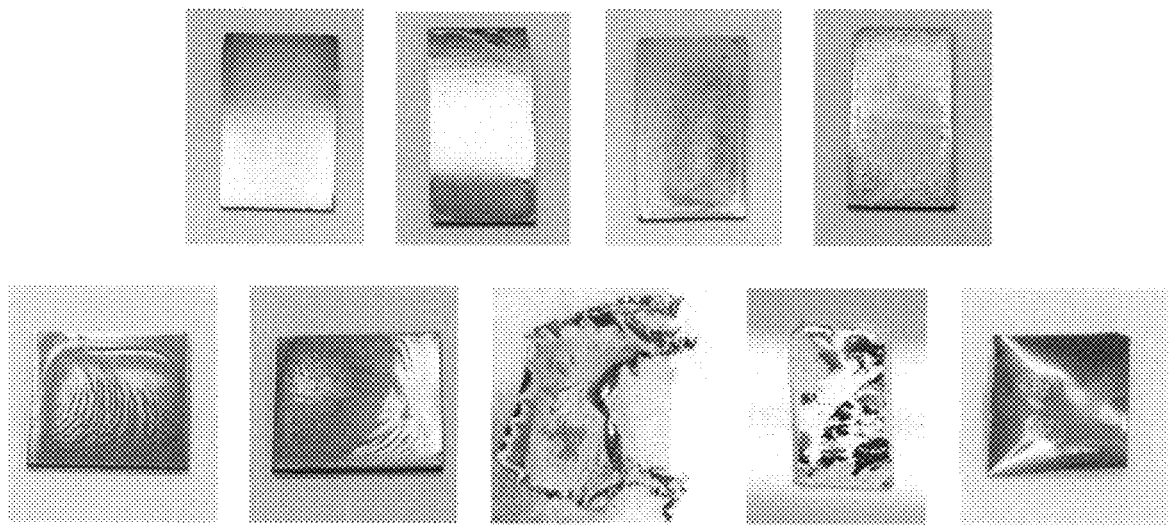

[Fig.43]
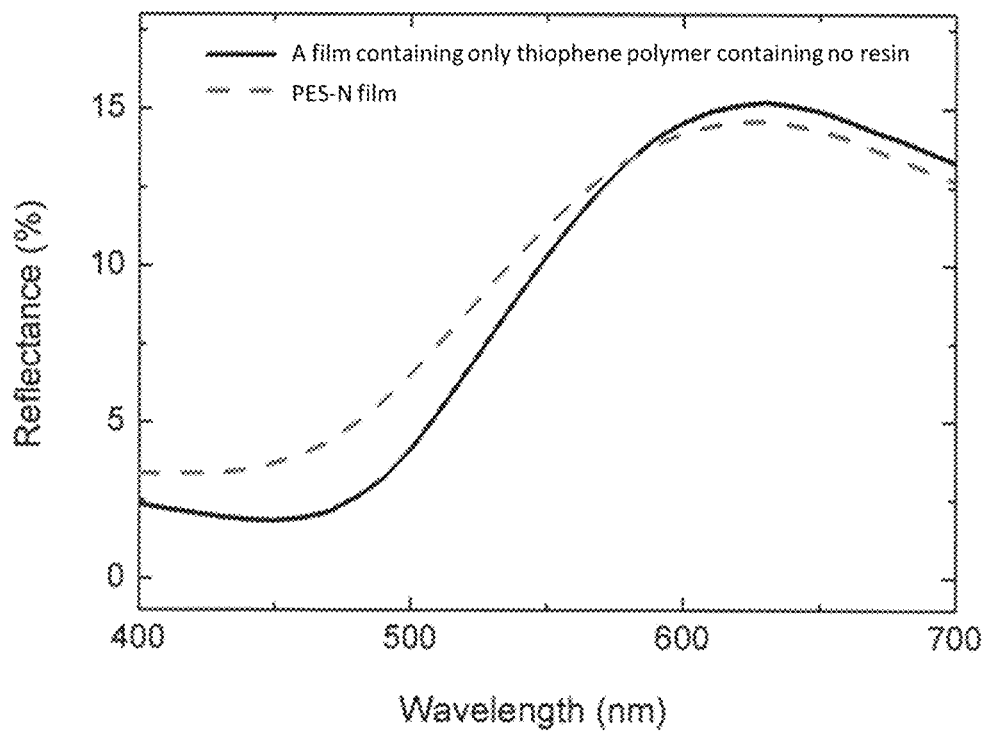
[Fig.44]
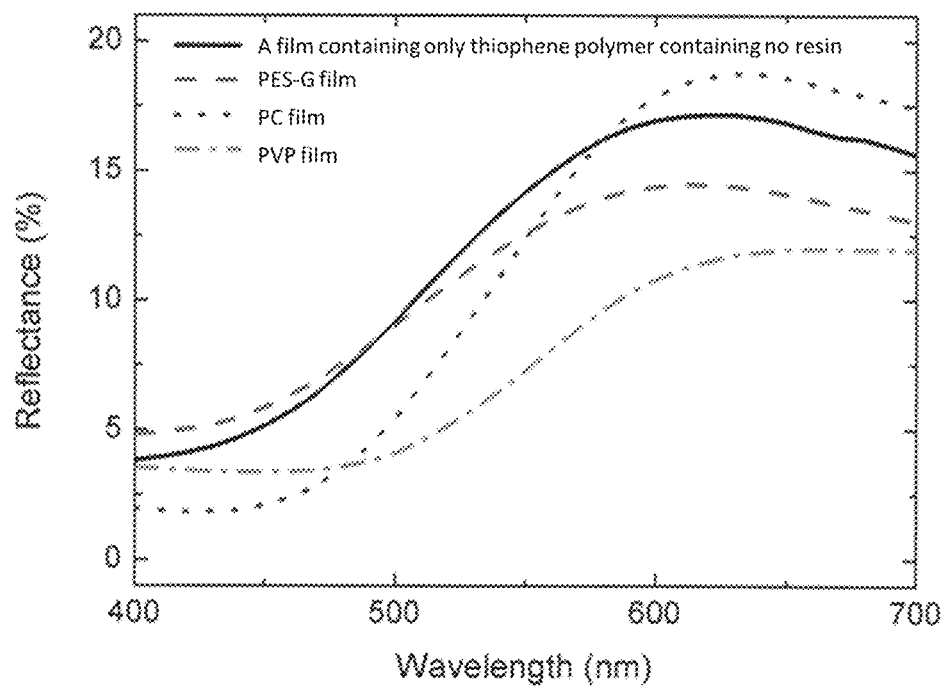

[Fig.45]
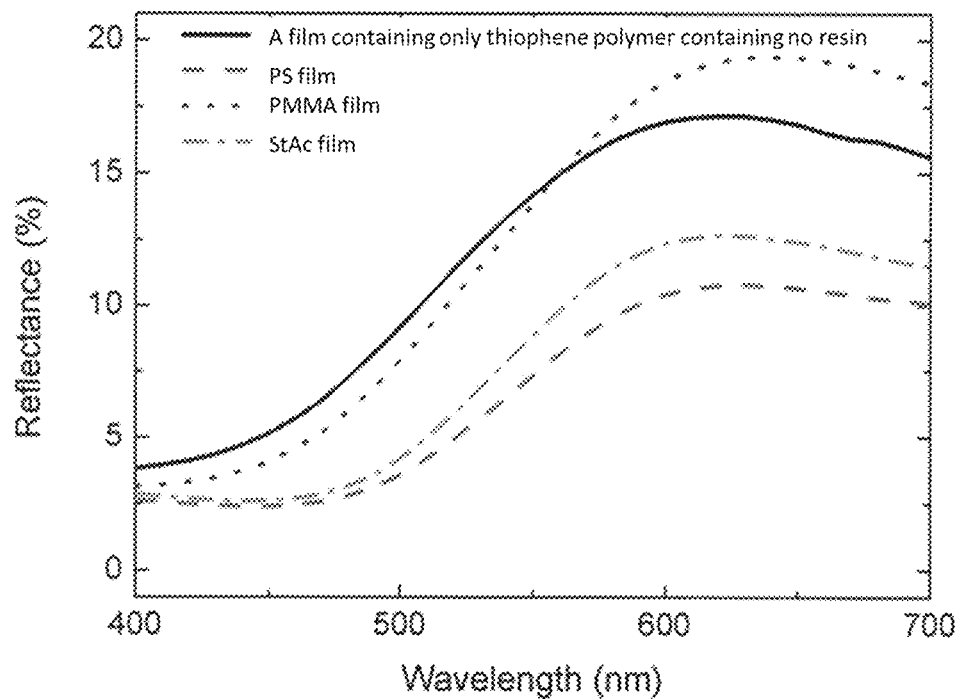
[Fig.46]
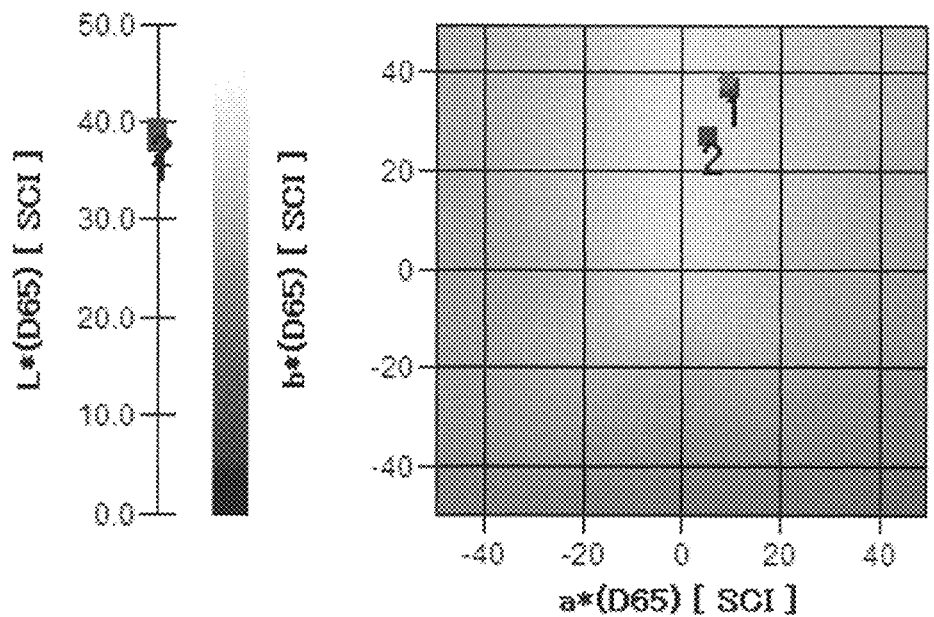

[Fig.47]
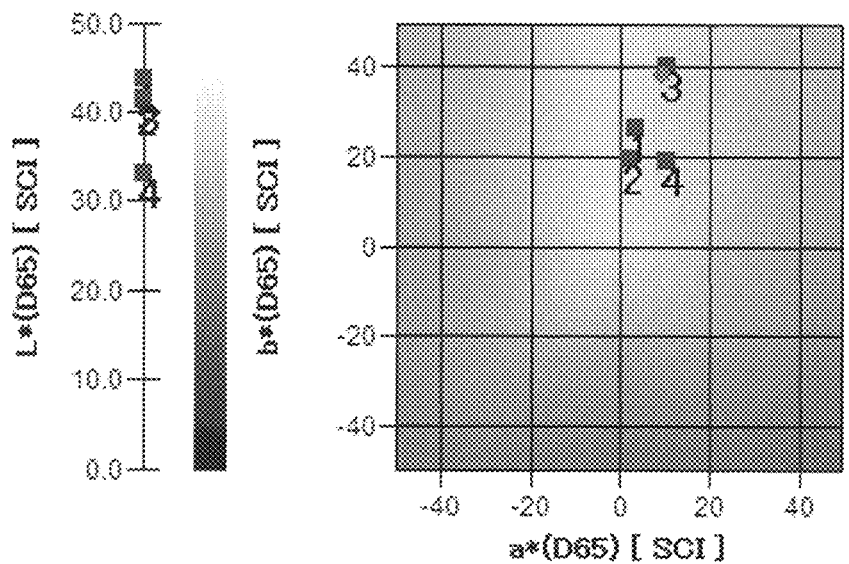
[Fig.48]
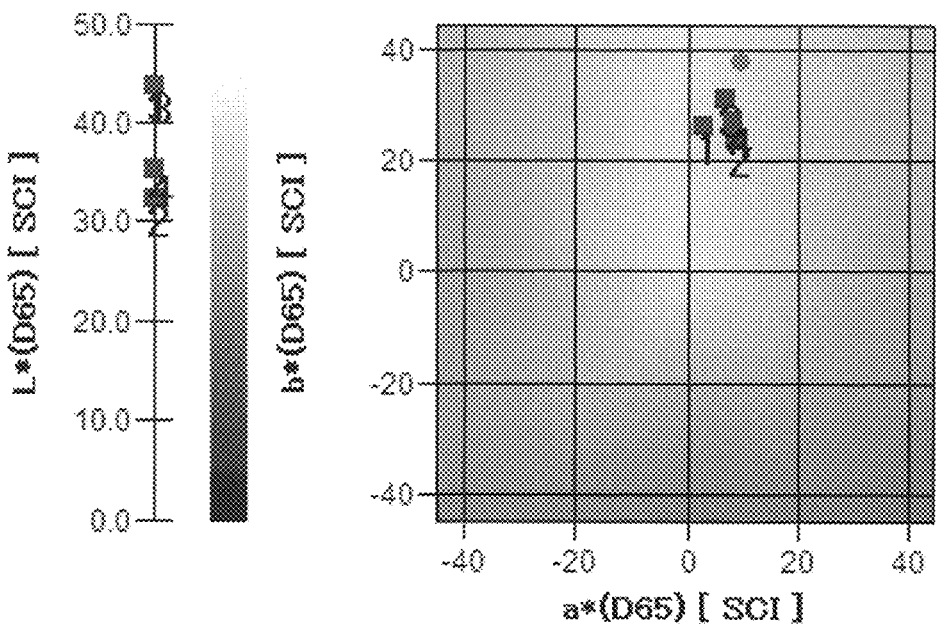

[Fig.49]
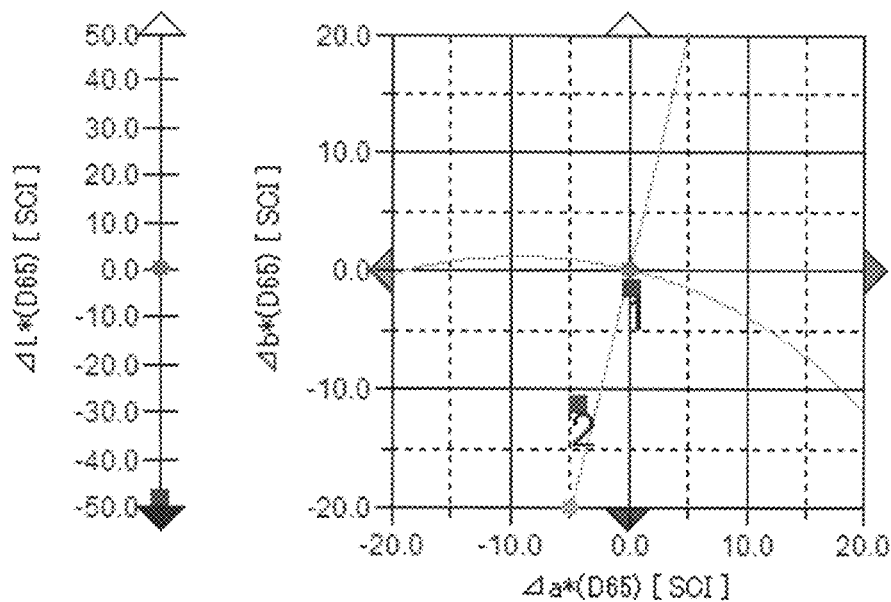
[Fig.50]
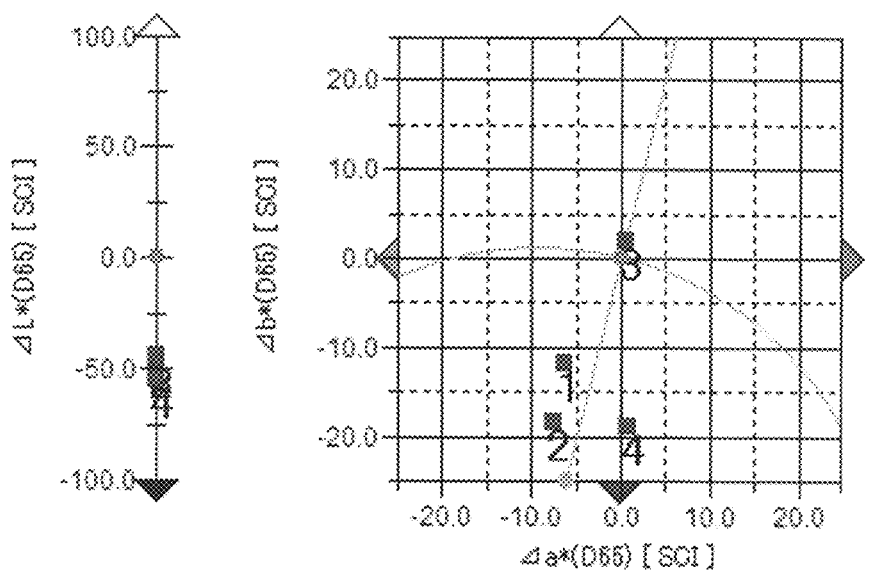

[Fig.51]
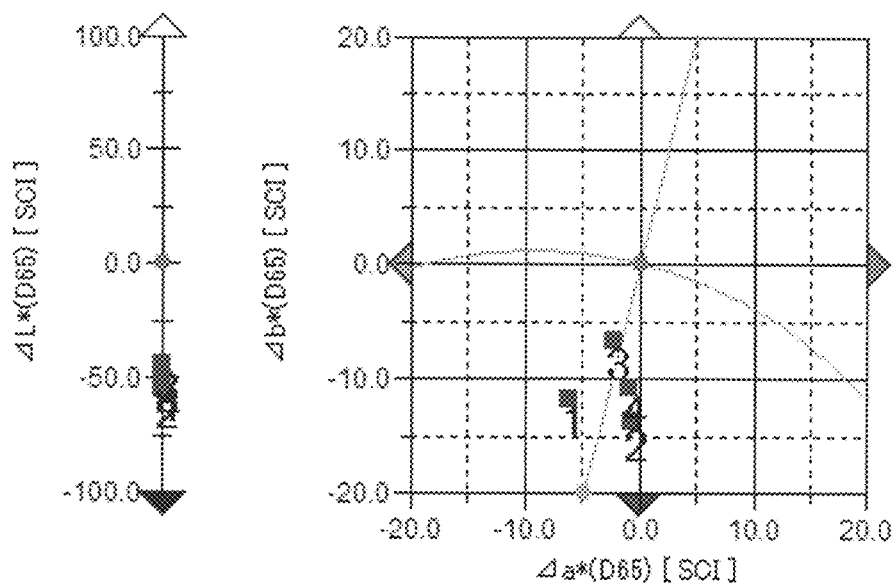
[Fig.52]
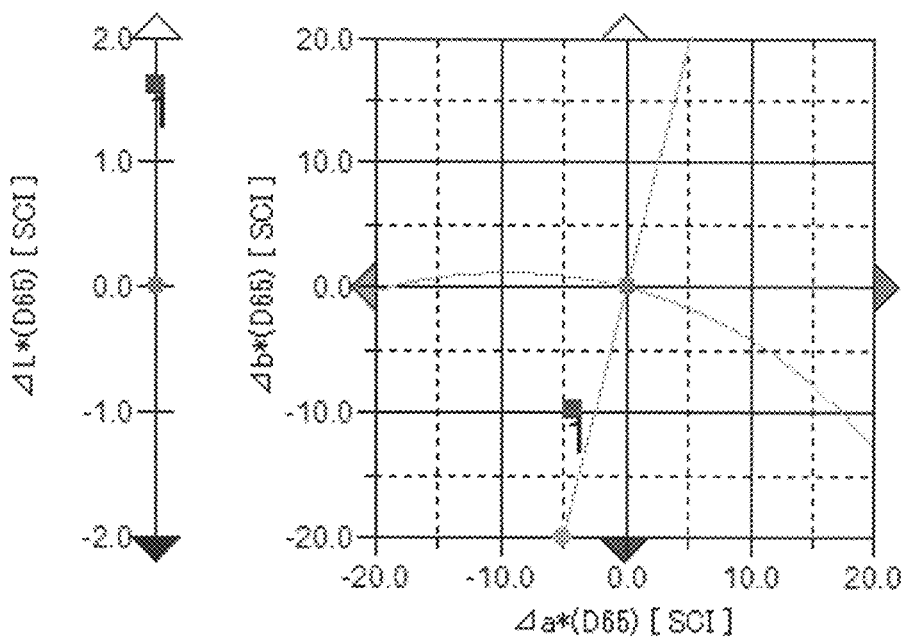

[Fig.53]
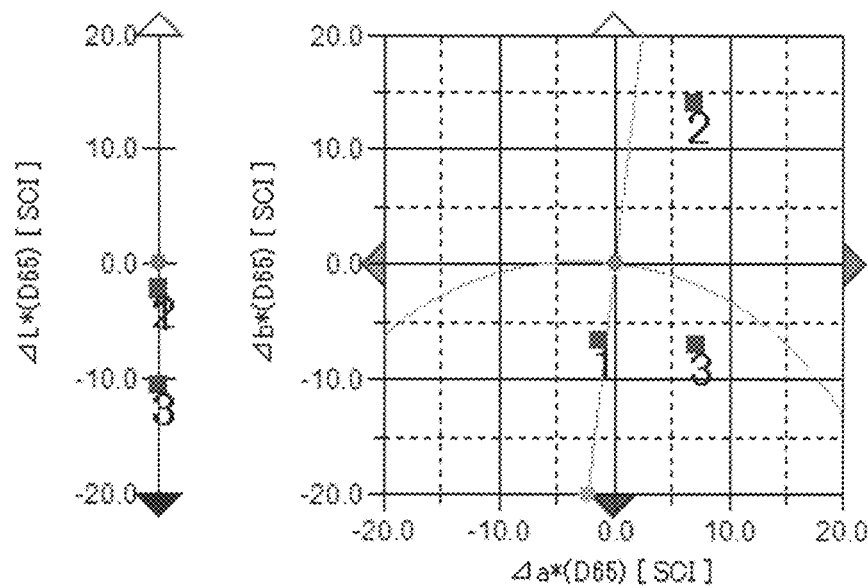
[Fig.54]
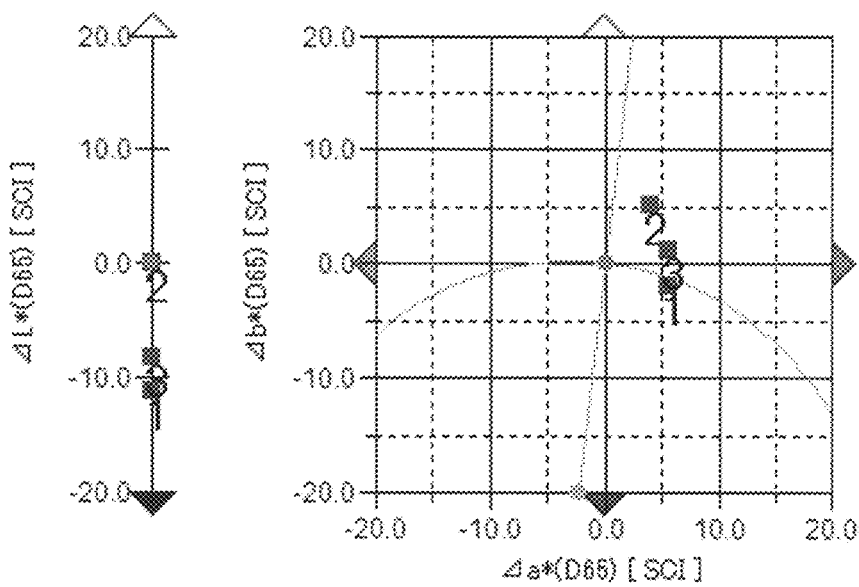

[Fig.55]
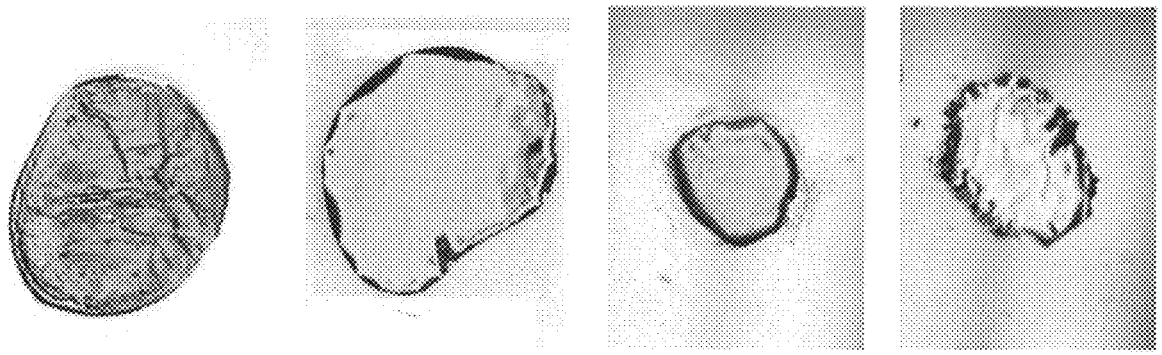
[Fig.56]
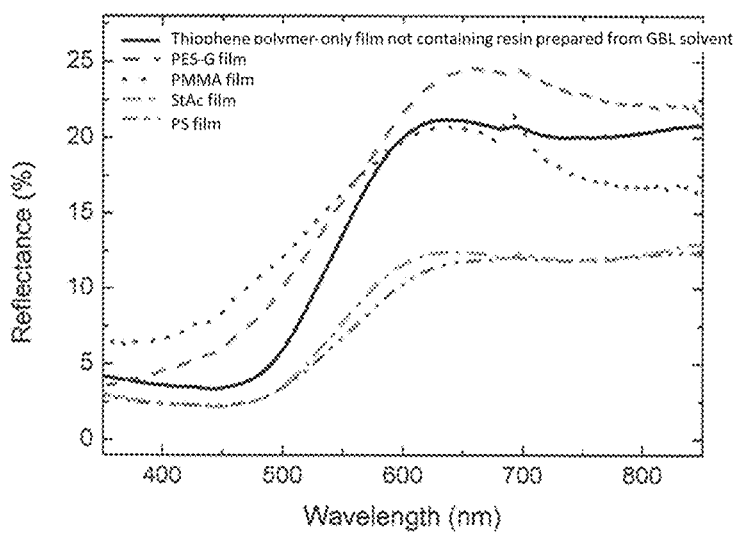

[Fig.57]
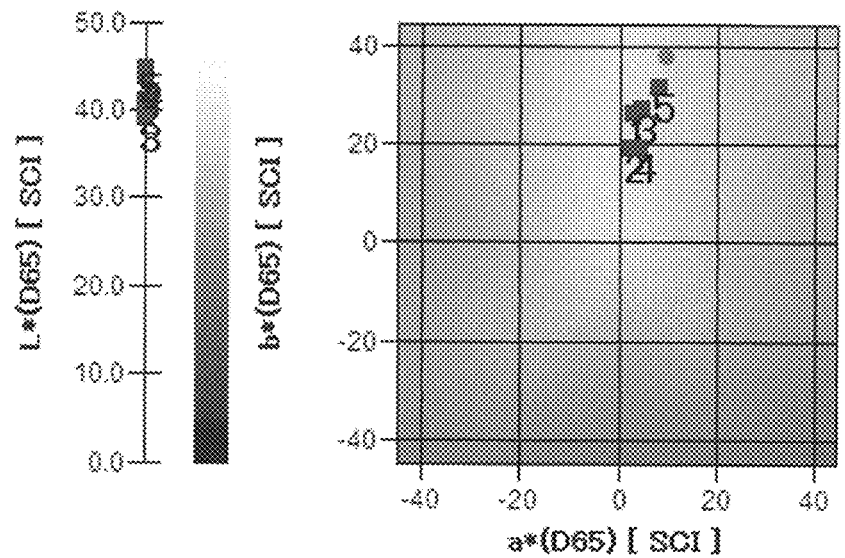
[Fig.58]
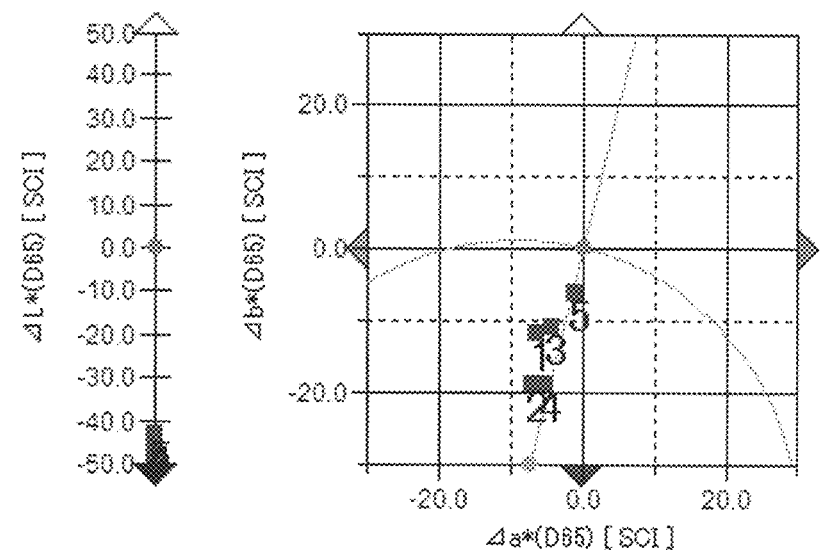

[Fig.59]
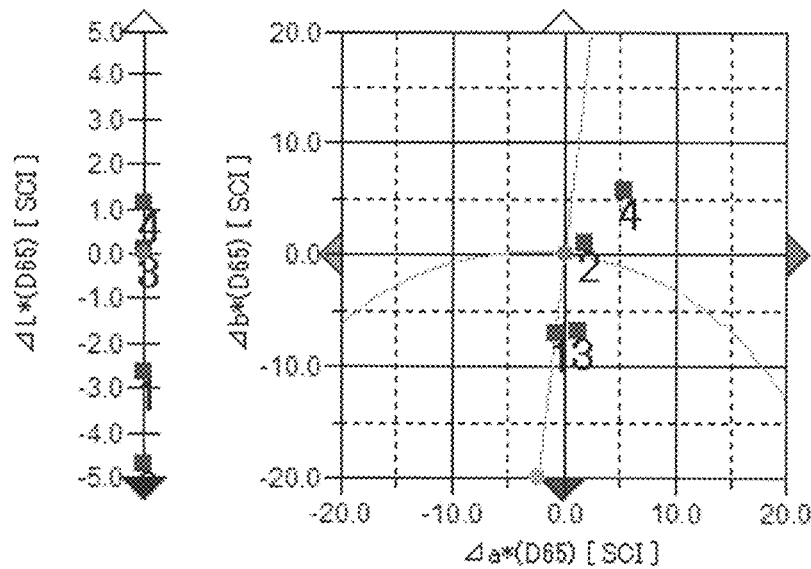
[Fig.60]
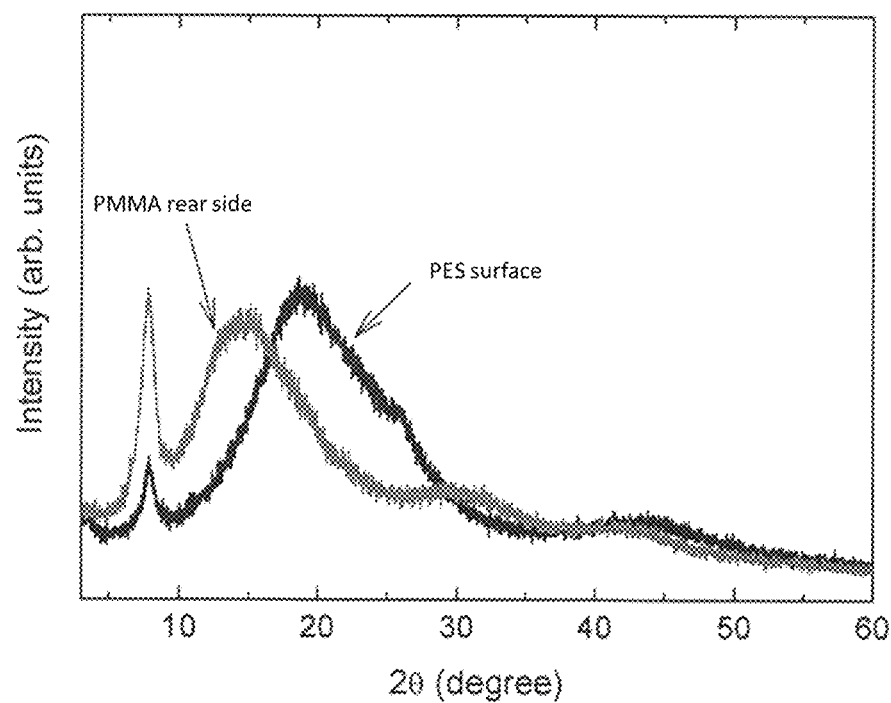

[Fig.61]
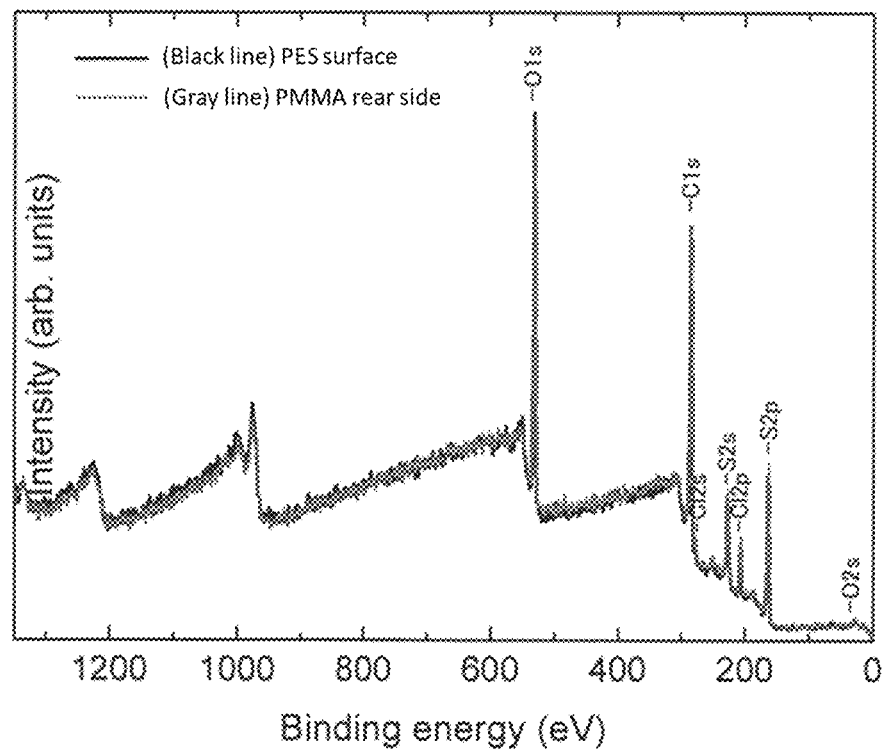
[Fig.62]
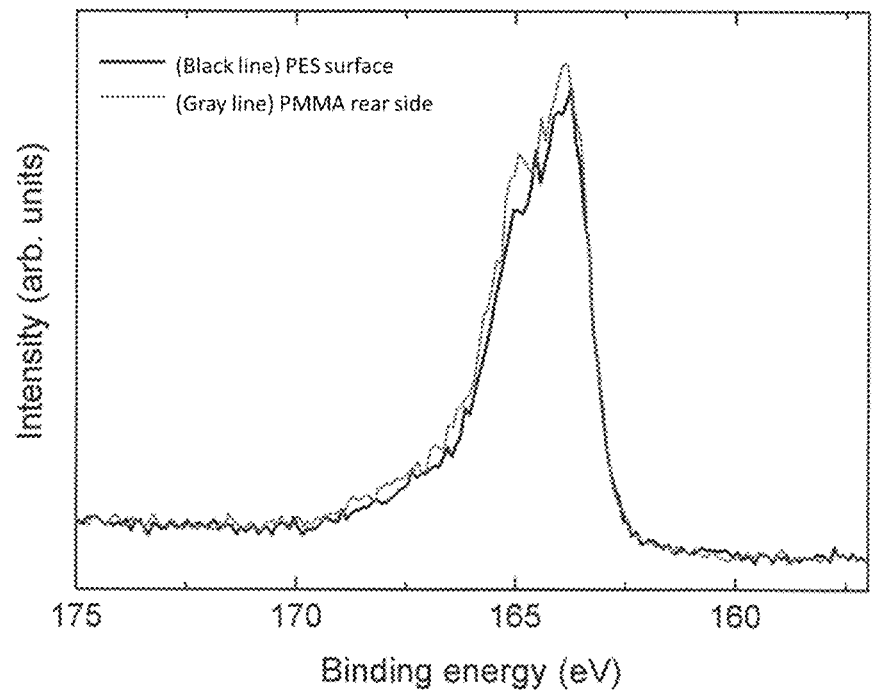

[Fig.63]
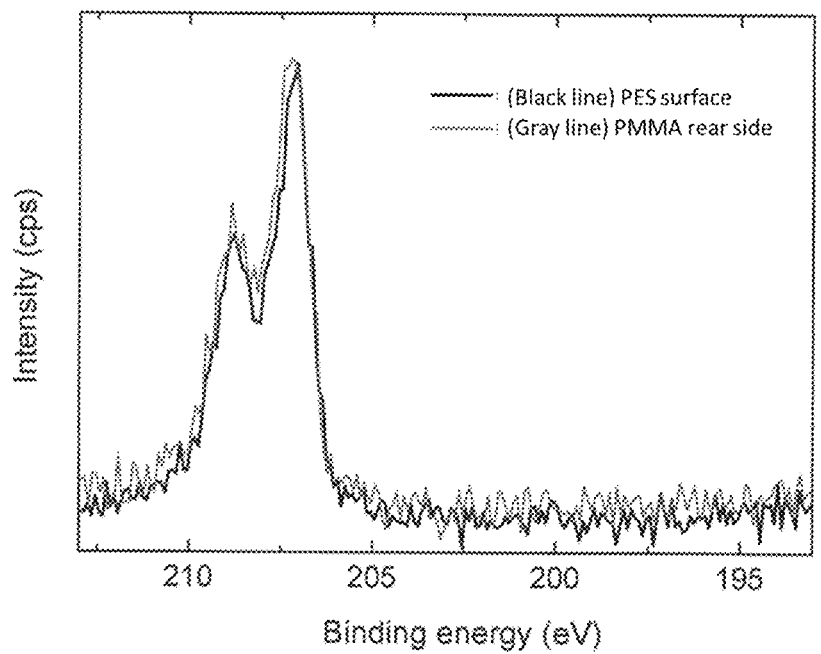

METHOD FOR PRODUCING ARTICLES HAVING A METALLIC LUSTER, AND TONERS WITH A METALLIC LUSTER USING THE SAME AND A PRINTING METHOD USING THE SAME

CROSS REFERENCE TO RELATED APPLICATIONS

This is the U.S. national stage of application No. PCT/JP2017/020373, filed on May 31, 2017. Priority under 35 U.S.C. § 119(a) and 35 U.S.C. § 365(b) is claimed from Japanese Application No. 2016-223667, filed on Nov. 16, 2016, Japanese Application No. 2016-136489, filed on Jul. 11, 2016 and Japanese Application No. 2016-109631, filed on May 31, 2016, the disclosures of which is also incorporated herein by reference.

TECHNICAL FIELD

The present invention relates to a method for producing articles having a metallic luster and toners with metallic lustrous colors and a printing method using the same.

BACKGROUND OF THE INVENTION

As a metal is generally hard, it is used for parts which need mechanical strength such as household electrical appliances, cars, etc. In addition, it is also used for almost all articles in our daily life, since metals have lustrous property and good texture. Especially, gold is very popular because it provides feeling of high quality. However, gold has the disadvantage that it is not only expensive but also difficult to process.

As means for overcoming the above-mentioned disadvantages, there are some techniques such as metal plating and the surface coating methods. The metal plating method comprises a step of coating the surface of articles made of polymers and glasses, with a thin metal film. The surface coating method comprises a step of coating the surface of articles with paints containing small particles and/or flaky metals. By using these techniques, it becomes possible to in expensively manufacture the articles having a metallic luster through the processes of producing articles and then coating them with thin metal films or paints containing fine metal particles.

However, with regard to the above-mentioned metal plating, the material which can be used for surface processing is greatly restricted. Moreover, metals are inevitably required in the above techniques. Though the cost of articles prepared by these techniques is lower than that of articles only made of metals, it is still high. Especially, in the above mentioned coating paints which comprise metals, metals are easy to precipitate owing to the difference in specific gravity between the solvent and metal. Accordingly, a problem that the unevenness of luster is caused often occurs.

Accordingly, it is considered that if nonmetallic materials with a metallic luster exist, the above-mentioned problem will be solved. As prior arts concerning nonmetallic materials with a metallic luster, the following PATENT DOCUMENT 1 is mentioned.

RELATED ART DOCUMENT

Patent Document

[PATENT DOCUMENT 1] WO2014/0231405

DESCRIPTION OF THE INVENTION

Problems to be Solved by the Invention

However, the technique described in the above-mentioned Patent Document 1 involves the dissolution of nonmetallic materials in solvents and coating an article with the resultant paints, therefore, dissolution processed are required. If a metallic luster can be obtained without using solvents, the range of application will be expanded.

Therefore, in view of the above problems, it is an object of the present invention to provide a method for producing novel articles having a metal-like luster without using solvents when forming articles having a metal-like luster, toners for the development of metallic color tone using the same, and the printing method using the same.

Solution to the Problems

A method for manufacturing items having a metal-like metallic luster according to one aspect of the present invention for solving the above-mentioned problems is to pressurize a thiophene polymer.

Also, from this viewpoint, the thiophene polymer is preferably prepared by chemical polymerization or electrochemical polymerization.

The metallic gloss color toners according to another aspect of the present invention includes thiophene polymers.

A printing method according to another aspect of the present invention is a method for fixing metallic lustrous color toners containing a thiophene polymers on a sheet of paper by pressurizing the metallic luster color toner.

Effects of the Invention

As described above, according to the present invention, a method for producing an articles having a metal-like luster without using solvents when forming articles having a-metal-like luster, a toner for the development of metallic color tone and a printing method using the same can be provided.

BRIEF DESCRIPTION OF THE DRAWINGS

FIG. 1 is a diagram schematically showing an article having a metal-like luster according to Embodiment 1.

FIG. 2 is a diagram schematically showing another example of the article having a metal-like luster according to Embodiment 1.

FIG. 3 is a diagram showing an image of a manufacturing process of an article having a metal-like lustrous film according to Embodiment 1.

FIG. 4 is a view showing an image of the manufacturing process of the article having a metal-like luster according to the first embodiment.

FIG. 5 is a diagram showing an image of toner particles according to an application example.

FIG. 6 is a diagram showing an image when printing is performed using toner particles according to application examples.

FIG. 7 is a photograph of the article having a metal-like luster prepared in the example.

FIG. 8 is a photograph of the article having a metal-like luster prepared in the example.

FIG. 9 is a photograph of the article having a metal-like luster prepared in the example.

FIG. 10 is a photograph of the article having a metal-like luster prepared in the example.

FIG. 11 is a photograph of the article having a metal-like luster prepared in the example.

FIG. 12 is a photograph of the article having a metal-like luster prepared in examples.

FIG. 13 is a photograph of the article having a metal-like luster prepared in the example.

FIG. 14 is a diagram showing specular reflection spectra of articles having a metal-like luster prepared in examples.

FIG. 15 is a graph showing the relationship between the pressure applied at the time of pressing and the maximum reflectance.

FIG. 16 is a diagram showing a 3D image and an arithmetic average roughness Ra by a laser microscope.

FIG. 17 is a diagram showing a 3D image and an arithmetic average roughness Ra by a laser microscope.

FIG. 18 is a diagram showing a 3D image and an arithmetic average roughness Ra by a laser microscope.

FIG. 19 is a diagram showing a 3D image and an arithmetic average roughness Ra by a laser microscope.

FIG. 20 is a diagram showing a 3D image and an arithmetic average roughness Ra by a laser microscope.

FIG. 21 is a diagram showing a 3D image and an arithmetic average roughness Ra by a laser microscope.

FIG. 22 is a diagram showing a 3D image and an arithmetic average roughness Ra by a laser microscope.

FIG. 23 is a diagram showing the relationship between the pressure applied at the time of pressing and Ra.

FIG. 24 is a photograph of a film having a metal-like luster prepared by powdering thiophene oligomer and rubbing.

FIG. 25 is a diagram showing the measurement results of specular reflection spectra of film prepared by rubbing (solid curve) in comparison with a solution cast film (dotted curve).

FIG. 26 is a view showing the result of colorimetry of a film produced by rubbing.

FIG. 27 is a diagram showing the results of X-ray diffraction spectrum measurement of a film produced by rubbing.

FIG. 28 is a diagram showing the structure image of the edge-on lamella and the face-on lamella.

FIG. 29 is a diagram schematically showing the article according to the third embodiment.

FIG. 30 is a diagram showing another example of the shape of the article according to the third embodiment.

FIG. 31 is a diagram showing a films prepared from a nitromethane solutions.

FIG. 32 is a diagram showing films prepared made from GBL solutions.

FIG. 33 is a diagram showing specular reflection spectra of films made from nitromethane solutions.

FIG. 34 is a diagram showing specular reflection spectra of films made from GBL solutions.

FIG. 35 is a chromaticity diagram of the films prepared from nitromethane solutions.

FIG. 36 is a chromaticity diagram of a film made from a GBL solution.

FIG. 37 is a view showing a difference between films prepared from a nitromethane solutions and an evaporated gold film.

FIG. 38 is a diagram showing a difference between films prepared from GBL solutions and an evaporated gold film.

FIG. 39 is a diagram showing the color difference between the films prepared from nitromethane solutions and an evaporated gold film.

FIG. 40 is a diagram showing the color difference between a film made from a GBL solution and a gold evaporated film.

FIG. 41 is a photograph of an article having a three-dimensional shape according to an example.

FIG. 42 is a photograph of gold-like lustrous films prepared in examples.

FIG. 43 is a view showing the total reflection spectrum of the gold-like lustrous films produced in the example.

FIG. 44 is a view showing the total reflection spectrum of the gold-like lustrous films prepared in the example.

FIG. 45 is a view showing the total reflection spectrum of the gold-like lustrous films produced in the example.

FIG. 46 is a diagram showing absolute values of colorimetric data for gold-like lustrous films prepared in the example.

FIG. 47 is a diagram showing absolute values of colorimetric data for gold-like lustrous films prepared in the example.

FIG. 48 is a diagram showing the absolute values of the colorimetric data for gold-like lustrous films prepared in the example.

FIG. 49 is a diagram showing the color difference between the evaporated gold film and the gold-like lustrous films of the example.

FIG. 50 is a view showing the color difference between the evaporated gold film and the gold-like lustrous films of the example.

FIG. 51 is a diagram showing the color difference between the evaporated gold film and the gold-like lustrous films of the example.

FIG. 52 is a diagram showing the color difference between the gold-like lustrous films without resin and the gold-like lustrous films of the example.

FIG. 53 is a diagram showing the color difference between the gold-like lustrous films without resin and the gold-like lustrous films of the example.

FIG. 54 is a diagram showing the color difference between the gold-like lustrous film without resin and the gold-like lustrous films according to the example.

FIG. 55 is a photograph of the gold-like lustrous films prepared in the example.

FIG. 56 is a view showing the total reflection spectra of the gold-like lustrous films produced in the example.

FIG. 57 is a diagram showing absolute values of colorimetric data of the gold-like lustrous films prepared in the example.

FIG. 58 is a diagram showing the color difference between the evaporated gold film and the gold color tone film of the example.

FIG. 59 is a diagram showing the color difference between the gold-like lustrous films without resin and the gold-like lustrous films of the example.

FIG. 60 is a diagram showing the X-ray diffraction spectra.

FIG. 61 shows the wide scan XPS spectra for the PES surface and the PMMA back surface.

FIG. 62 is the XPS spectra in the S2p region for the PES surface and the PMMA back surface.

FIG. 63 is the XPS spectra in the Cl2p region for the PES surface and the PMMA back surface.

BEST MODE FOR CARRYING OUT THE INVENTION

Hereinafter, embodiments of the present invention will be described in detail with reference to the drawings. However, the present invention can be practiced in many different modes, and is not limited to the following embodiments and examples.

Embodiment 1

[Articles Formed with a Film Having a Metal-Like Luster]

FIG. 1 is a schematic cross-sectional view of an article (hereinafter referred to as "article having a metal-like luster") formed with a metal-like luster film containing a thiophene polymer according to this embodiment.

Here, the article according to the present embodiment is not exclusively limited as long as it has a metal-like luster, and it can be applied not only to electronic machinery parts such as household electric appliances and automobiles, but also to miscellaneous goods used in daily life such as furniture and toys, clothes, paper products, and the like. The articles with flat surface are preferable examples because the pressure can be uniformly applied on the flat surfaces. In the example of this figure, an example of paper is shown. Also, as described later, the entire article itself may be an article having a metal-like luster.

In the present embodiment, the thickness of the film having a metal-like luster is not limited as far as it can develop a metal-like luster, but if it is 0.1 μm or more, it can be a film having metallic luster, more preferably 0.3 μm or more, and even more preferably 0.6 μm or more, a film having sufficient a metal-like luster is obtained.

In addition, the film having a metal-like luster according to this embodiment includes a thiophene polymer.

In the present embodiment, "thiophene polymer" is a polymer in which two or more thiophenes bonded to each other and are polymerazed, and is a compound represented by the following general formula.

[Chemical formula 1]

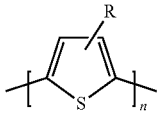

In the above formula, R is a substituent and is not limited as long as it can impart a metal-like luster to the film, but it is preferably an alkoxy group, an amino group, an alkyl group, a hydroxyl group, a hydroxyalkyl group, an aryl group, a cyano group, or halogen atoms. In addition, R may be one or two on one thiophene ring. In the thiophene polymers concerning this embodiment, the above R of each thiophene ring may be the same or different.

It is to be noted that "thiophene" is a heterocyclic compound containing sulfur and is a compound represented by the following general formula, as is evident from the above description. In the formula, the definition of R is the same as above.

[Chemical formula 2]

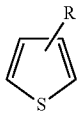

In the above formula, when R is an alkoxy group, it is not limited, but the number of carbon atoms is preferably 1 or more and 8 or less, More specifically 3-methoxythiophene, 3,4-dimethoxy thiophene, 3-ethoxythiophene, 3,4-diethoxythiophene, 3-propoxythiophene, 3-butoxythiophene, 3-hydroxythiophene, 3,4-ethylenedioxythiophene, 3,4-propylene dioxythiophene can be exemplified.

In the above formula, when R is an alkyl group, it is not limited, but the number of carbon atoms is preferably 1 or more and 12 or less. More specifically 3-methylthiophene, 3,4-dimethyl Thiophene, 3-ethylthiophene, 3,4-diethylthiophene, 3-butylthiophene, 3-hexylthiophene, 3-heptylthiophene, 3-octylthiophene, 3-nonylthiophene, 3-decylthiophene, 3-undecylthiophene, 3-dodecylthiophene, 3-bromo-4-methylthiophene can be exemplified.

In the above formula, when R is an amino group, examples thereof include 3-aminothiophene, 3,4-diaminothiophene, 3-methylaminothiophene, 3-dimethylaminothiophene, 3-thiophene carboxamide, 4-(thiophene-3-yl) aniline and the like.

In the present embodiment, the molecular weight of the "thiophene polymer" is not limited as long as a film with a gold-like luster can be formed using the polymer. In the present embodiment, the molecular weight of the "thiophene polymer" is preferably such that the peak value in the molecular weight distribution determined by the GPC (gel permeation chromatography) measurements is within the range of from 200 to 30000, more preferably from 500 to 10000.

In addition, as described above, the article having a metal-like luster according to the present embodiment can be constituted by an article including a thiophene polymer having metallic luster instead of forming a film having a metal-like luster on the surface of the article. Although the production method will be described later, it may be one in which the thiophene polymer is molded so as to have the shape itself of the desired article and has a metal-like luster. As an example of this, an example of a tablet shaped article is shown in FIG. 2.

Method for Producing Article Having Metallic Shine

In the present embodiment, a method for producing a metallic luster article comprising a thiophene polymer (hereinafter also referred to as "the present method") comprises placing a powder of a thiophene polymer on an article and pressurizing the thiophene polymer.

Also from this viewpoint, the thiophene polymer is preferably formed by chemical polymerization or electrochemical polymerization.

[Chemical Polymerization]

In the present embodiment, as described above, the thiophene polymer can also be produced using chemical polymerization. Here, the "chemical polymerization method" stands for the polymerization performed in the liquid phase or solid phase using an oxidizing agent.

In the present embodiment, as in the case of electrochemical polymerization, the reason why the thiophene polymer shows a metal-like luster is only speculative, however, it is most likely that the thiophene polymer molecules are regularly oriented and reflect a specific wavelength. This is supported by the experimental fact that the film exhibited sharp peaks in its X-ray diffraction pattern. The details will be demonstrated by the embodiment described below. Briefly, three peaks are shown in the reflection angle (2θ) of 5 degree to 20 degree and the signals can be attributed to the crystallites of the thiophene polymer.

The article relating to the present embodiment is the film consisting of the above thiophene polymer. This thiophene polymer is very stable in the air and hardly deteriorates even if it is left in the air for a long time. Therefore, its metallic luster is kept for a long time.

Herein, the method for producing films having a metallic luster using the chemical polymerization method in this embodiment (hereinafter simply referred to as "the present method") will be described.

This method comprises (1) a step of polymerizing thiophene monomers in a solvent using an oxidizing agent to form a solution containing a thiophene polymer, and (2) a step of removing a solution containing the tiophene polymer to obtain a thiophene polymer powder. That is, in this embodiment, chemical polymerization is performed to produce a thiophene polymer.

First, in this method, (1) thiophene is polymerized using an oxidizing agent to prepare a solution containing the thiophene polymer. "Thiophene" and the obtained "thiophene polymer" used herein are those described above. As described above, the thiophene polymer is preferably in the range of a so-called oligomer, specifically, it is preferable to polymerize so that the distribution peak of the weight average molecular weight falls within a range of from 200 to 30,000.

In this step, the oxidizing agent is not limited as long as it is capable of producing a thiophene polymer, and various oxidizing agents can be used, for example, ferric salt, cupric salt, cerium salt, dicromic acid salts, permanganate, ammonium persulfate, boron trifluoride, bromate, hydrogen peroxide, chlorine, bromine and iodine, among which the ferric salt is preferred. It may be a hydrate. In addition, in this case, the counter of ions can also be chosen adjusted and is not limited, and examples thereof include a chloride ion, a citrate ion, an oxalate ion, a p-toluenesulfonate ion, a perchlorate ion, a hexa fluorophosphate ion, tetrafluoroborate ion and the like. Among them, when at least one of a perchlorate ion, a hexafluorophosphate ion, a tetrafluoroborate ion is used, a metallic luster similar to a metallic gold color can be obtained, which is preferable. The reason why metallic luster similar to gold color can be obtained is only speculative; however, perchlorate, hexafluorophosphate, tetrafluoraborate, and chloride ions are doped in the thiophene polymer during polymerimerization, and the dopants combine with the cationic sites in the thiophene polymer. This doping should stabilize the thiophene polymer, and therefore, facilitate the formation of an ordered crystalline structures in the film. In fact, when we analyze the structure of the film having a metallic luster, it was confirmed that these crystalline structures stably exist.

In this step, it is preferable to carry out the polymerization in a solvent using a solvent. The solvent to be used is not limited as long as it can sufficiently dissolve the above-mentioned oxidizing agent and thiophene and polymerize efficiently, but it is preferable that it is an organic solvent having high polarity and a certain degree of volatility. For example, acetonitrile, nitromethane, γ-butyrolactone, propylene carbonate, nitromethane, 1-methyl-2-pyrrolidinone, dimethylsulfoxide, 2-butanone, tetrahydrofuran, acetone, methanol, anisole, chloroform, ethyl acetate, hexane, trichlorethylene, cyclohexanone, dichloromethane, chloroform, dimethylformamide, ethanol, butanol, pyridine, dioxane, and mixtures thereof, and the like can be used. Acetonitrile, nitromethane, γ-butyrolactone and propylene carbonate are preferable because the thiophene polymer is soluble and it tends to be a film having better metal gloss.

In this step, the amount of thiophene and oxidizing agent to the amount of solvent can be appropriately adjusted and is not limited, but when the weight of the solvent is taken as 1, the weight of thiophene is 0.00007 or more and 7 or less, more preferably 0.0007 or more and 0.7 or less, and in the case of iron perchlorate n hydrate, the weight is preferably 0.0006 or more and 6 or less, more preferably 0.006 or more and 0.6 or less.

In this step, the ratio of the thiophene and the oxidizing agent used is preferably 0.1 to 1,000, more preferably 1 to 100, when the weight of thiophene is taken as 1.

In addition, in this step, thiophene and an oxidizing agent may be added to the solvent at once, but two kinds of solutions are separately prepared: a solution prepared by adding thiophene to the solvent and a solution obtained by adding an oxidizing agent to the solvent, and these are added polymerization reaction may be carried out by mixing these solutions.

In the present method, it is preferable that the thiophene polymer prepared above is isolated as a powder form (thiophene polymer powder) by removing the solvent. By doing so, it becomes possible to easily produce articles having a metallic luster only by pressurization. It should be noted that when the oxidizing agent contains the perchlorate ion, the hexafluorophosphate ion, the tetrafluoroborate ion, and the chloride ion, the metallic lustrous property can be stably maintained owing to the doping of the polymer with the anion.

[Electrolytic Polymerization]

In the present embodiment, electrolytic polymerization is a method of dissolving a substance (monomer), a precursor of a polymer, in a solution containing a supporting electrolyte and oxidizing electrochemically the monomer to form an insoluble polymer film on the conductor.

Further, in the present embodiment, it is preferable to use a potential sweep during the electropolymerization. The potential sweep method is a treatment in which a pair of electrodes are immersed in a solution containing a supporting electrolyte and a potential is applied while changing the potential at a constant speed.

The solvent of the solution used in the present embodiment is not particularly limited, but in addition to water and alcohol, for example, the solvents described in Akira Fujishima, Masuo Aizawa, Toru Inoue, Electrochemical Measurement Method, Gihodo Publishing, Volume 1, pp. 107-114, 1984 can be adopted.

Mixed solvents of various solvents are also preferable.

The supporting electrolyte is the solution used in the present embodiment is an essential component in electrolysis and is preferably a component that is sufficiently dissolved in a solvent and has a cation or anion that is difficult to be electrolyzed as a constituent. In the supporting electrolyte of the solution used in the present embodiment, it is preferable to use at least one of lithium salt, sodium salt, potassium salt, calcium salt or tetraalkylammonium salt, for example, when paying attention to the cation. Also, the supporting electrolyte in the solution used in the present embodiment can be prepared, for example, from a halide, a sulfate, a nitrate, a phosphate, a perchlorate, a boron trifluoride salt or a hexafluorophosphate when paying attention to the anion. The concentration of the supporting electrolyte is not limited, but it is preferably 0.001 M or more and not more than solubility, more preferably 0.01 M or more and 1 M or less.

In the present embodiment, the concentration of the thiophene monomer used for the electroporimarization in the electrolyte solution is not limited, but it is preferably 0.1 mM or more and not more than solubility, more specifically 1 mM or more and 1 M or less.

Further, in this embodiment, the three electrode system composed of a working electrode, a counter electrode, and a reference electrode can be employed, or a two electrode system comprising of a working electrode and a counter electrode can be also used. The three electrode system which can precisely define the electric potential of the electric conductor with respect to the reference is more preferable in that the thiophene-powder containing articles having metallic luster can be reproducibly constructed.

In any of the three-electrode system and the two-electrode system, the conductor as the working electrode is not limited as long as it is a material that is stable to the electrode oxidation. For example, as described above, indium-tin-oxide (hereinafter abbreviated as ITO) or tin-oxide coated glass plate electrode, a metal electrode, a glassy carbon electrode or the like can be suitably used. In addition to the above electrode material, a metal electrode such as stainless steel or a copper plate can be suitably used as the counter electrode. Further, although the reference electrode is not limited, for example, a silver/silver chloride electrode (Ag/AgCl electrode) or a saturated calomel electrode can be suitably used.

In the present embodiment, the potential is preferably sweeped between a negative potential and during the electropolymerization by the potential sweep method. In this case, the negative potential is preferably in the range of $-1.5$ V or more to $-0.01$ V or less, more preferably in the range of $-1.0$ V or more to $-0.1$ V or less, more preferably $-0.7$ V or more and $-0.2$ V or less. The positive potential is preferably in the range of $+1.0$ V or more and $+3.0$ V or less, more preferably in the range of $+1.0$ V or more and $+2.0$ V or less, more preferably in the range of $+1.0$ V or more and $+1.5$ V or less.

In the present embodiment, sweep rate in the potential seep method is not limited as long as an article having metallic luster can be manufactured, but it is preferably in the range of 0.1 mV/second or more and 10 V/second or less, more preferably 1 mV/second or more and 1 V/second or less, and further preferably 2 mV/second or more and 300 mV/second or less.

The time for the electropolymerization is not limited as long as articles having a metallic luster can be precipitated, but it is preferably carried out in the range of 1 second to 5 hours within the above range of the applied voltage, and more preferably in the range of 10 seconds to 1 hour.

The temperature in the electropoplymerization is not limited as far as articles having a metallic luster can be precipitated, but it is preferably in the range of $-20°$ C. to $60°$ C.

In addition, this electropolymerization is a reaction affected by the little involvement of component substances in the air, and is performed at a relatively low potential, therefore, it can be carried out in the air so it can be performed in the atmosphere. From the viewpoint of avoiding the possibility of contaminating the generated film with products generated by the electrochemical redox reactions, it is preferable to carry out the electropolymerization under a nitrogen or argon atmosphere, but there is almost no worry of contamination. Nevertheless, in the presence of a large amount of oxygen in the electrolyte solution, there is a possibility that the electrode reaction is perturbed. Hence, it is preferable to perform bubbling with an inert gas (nitrogen gas or argon gas).

In this method, the thiophene polymer prepared in the above manner is placed on the article and pressurized. As a result, it is possible to form articles having a metallic luster stably fixed on the article. Here, "pressurization" is the application of pressure to the membrane, so-called "rubbing" is also included in pressurization on the membrane. In this case, it is preferable that the thiophene polymer prepared in this case is in the form of a powder. An image diagram relating to the manufacture of this article is shown in FIG. 3.

In this method, the thiophene polymer prepared in the above manner can be placed in a mold composed of a metal or the like, and pressed to form the article itself with substantially only the thiophene polymer. An image diagram relating to the manufacture of this article is shown in FIG. 4.

Further, the range of the pressure during pressurization in this method is not particularly limited, but it is preferably 10 $kg/cm^2$ or more, more preferably 50 $kg/cm^2$ or more, for example. The upper limit is not limited as long as the film or article having a metallic luster is not destroyed, but it is preferably in the range of $1.0\times10^5$ $kg/cm^2$ or less, more preferably $5.0\times10^4$ $kg/cm^2$ or less. When it is set to 50 $kg/cm^2$ or more, the surface roughness can be reduced and glossy feeling can be shown more satisfactorily. By setting it to $5.0\times10^4$ $kg/cm^2$ or less, destruction of the structure of the article can be prevented.

In this method, it is also preferable to heat the article and the thiophene polymer during pressurizing. By doing like this, there is the effect that the pressure application efficiency is more increased, and furthermore, as described below, it is possible to melt the toner particles and stably fix the toner particles to an article such as paper. Note that the heating temperature is not particularly limited as long as it is lower than the thermal decomposition temperature.

As described above, according to the present invention, it is possible to provide a novel method for producing metallic lustrous articles without using a solvent in the preparation of articles having a metallic luster.

The inventors of the present invention have found that when a deep blue polythiophene-based conductive polymer is synthesized and dissolved in a solvent to coat the coating solution on the article, a goldlike coating film is formed. It is the world's first organic material that is soluble in solvents, and gives a gold color tone film by the solution casting method. On the other hand, this invention is based on the discovery that a metallic color tone is developed by applying pressure to this material. That is, it is the proposal based on the new principle that the color of the deep blue powder is changed to a metallic color such as goldlike tone by pressure stimulation.

Application Example: Toner

Application examples of the thiophene polymer according to the present embodiment are wide and not limited as is clear from the above description, but as one example considered to be very effective, toner materials for metallic color reproduction are given. That is, the toner for metallic gloss color according to this application example described below has a binder particle to which a thiophene polymer is externally added or internally added (or both addition modes), or a thiophene polymer itself constitutes the toner body.

As described above, the toner of the present invention is one in which a thiophene polymer is added to the resin particles externally or internally (or both), or the thiophene polymer itself serves as the toner main body. However, it may contain components necessary for the function of toner as long as it does not inhibit the formation of articles having metal a gloss developed by this thiophene polymer. Specifically, for example, a magnetic substance such as iron powder, wax, a charge control agent, an external additive and the like can be contained, but it is not limited thereto. An image diagram in this case is shown in FIG. 5.

In the case of a toner in which the thiophene polymer is added to the resin particles externally or internally (or in the both addition modes), the amount of the thiophene polymer added is not limited as long as a metal-like luster metallic gloss can be developed, it is 0.1% by weight or more, preferably 1% by weight or more, based on the total amount of the toner. Also, when no resin is used, the thiophene polymer occupies most of the weight of the toner.

In the printing method according to this application example, a metal-like lustrous toner including a thiophene polymer is disposed on an article, and the metallic luster color toner is pressed to fix the metallic luster color toner. In this case, as described above, by heating at the same time as pressurization, it is easy to fix the toner on an article such as paper owing to the melting of the toner resin. FIG. 6 shows an image diagram of this step.

As described above, according to the present invention, it is possible to provide a method for producing a novel metallic luster article which does not use a solvent when forming an article having a metallic luster. Further, according to the present invention, it is possible to provide a toner for expressing a metal-like lustrous tone. Further, according to the present invention, it is possible to provide a printing method for imparting metallic luster to an article.

Embodiment 2

A film formation by the so-called "rubbing", i.e., applying a force in the lateral direction will be described in more detail. The rubbing is form of the pressurization mentioned in the above embodiment.

More specifically, the method according to the present embodiment (hereinafter referred to as "the present method") is to produce an article having metallic gloss by rubbing a thiophene polymer. In this method, the "rubbing" means specifically applying a force in a direction (lateral direction) different from the pressurized direction in a pressurized state, more specifically, placing a powder of a thiophene polymer on a substrate and moving pressure jig on the substrate in a state where the powder is pressurized by a the pressure jig. Also, in this case, the pressure jig is not particularly limited, but it is preferable that a plate-like member or a plate-like member on which a weight is placed is able to uniformly apply a force, for example. By doing like this, it is possible to manufacture articles having a metallic luster as described above. Although this principle is still an estimate, it is thought that rubbing will induce a regular sequence to the sequence of the thiophene polymer, resulting in a film with metallic luster.

Also, when rubbing is involved in this method, the value of pressurization can be greatly reduced as compared with the case of only pressurization. More specifically, even with a pressure of 500 g/cm$^2$ or less, it is possible to obtain a metal-like (goldlike) luster by rubbing. It should be noted that the lower limit of the pressurization may be such that it can be said to be pressurized, for example 3 g/cm$^2$ or more. That is, when rubbing, the range of pressurization is 3 g/cm$^2$ or more and 500 g/cm$^2$ or less, more preferably 300 g/cm$^2$ or less.

As described above, according to the present embodiment, it is possible to manufacture a film having a metallic luster more easily by reducing the value of pressure.

Example

Here, the film according to the above embodiment was actually fabricated and its effect was confirmed. This will be described in detail below.

In the present example, when pressurizing powder of 3-methoxythiophene (3 MeOT) oligomer under pressure, it turned into a solid (tablet shape) with a goldlike luster. The appearance, specular reflection spectrum and arithmetic average roughness of each sample were evaluated by changing the pressure applied at the time of preparing the tablet.

[Preparation of 3MeOT Oligomer]

An acetonitrile solution (10 mL) of iron perchlorate (III) (concentration: 0.2 M) as an oxidizing agent was added to 10 mL of an acetonitrile solution of 3 MeOT (concentration 0.1 M) as a raw material monomer, and polymerization was conducted for 2 hours under a nitrogen atmosphere. After the polymerization, filtration, washing and vacuum drying were carried out to obtain a 3MeOT oligomer product.

[Preparation of 3MeOT Oligomer Tablet]

Next, the 3MeOT oligomer obtained by the above method was ground in a mortar for about 15 minutes and pulverized, and then a tablet (diameter 13 mm) was prepared using a tablet-forming machine (hand press SSP-10A manufactured by Shimadzu Corporation). For preparing one tablet, 100 mg of oligomer was used. Then, the load applied in that case was changed to 50 kg, 0.5 t, 1 t, 2 t, 4 t, 8 t, and 10 t (corresponding to the pressure of 0.038 ton/cm$^2$, 0.38 ton/cm$^2$, 0.75 ton/cm$^2$, 1.5 ton/cm$^2$, 3.0 ton/cm$^2$, 6.0 ton/cm$^2$, and 7.5 ton/cm$^2$, respectively), and each pressure was applied for 10 minutes to prepare a plurality of tablets (as for the 50-kg sample, pressure was added for 1 minutes.). Thereafter, the specular reflectance and the surface roughness of the obtained tablets were measured.

[Appearance]

The 3MeOT tablets prepared by changing the pressure of the press were photographed with Digital Microscope VHX-5000 of Keyence Corporation. These results are shown in FIG. 7 to FIG. 13.

As a result, it was confirmed that the samples produced at any pressure exhibited the gold-like luster. However, the sample treated by the pressure with a weight of 1 t (0.75 ton/cm$^2$) broke when taken out of the tablet forming apparatus.

In addition, when observing enlarged images of each sample, it was confirmed that more irregularities were observed on the surface as the pressure of the sample was lower.

[Specular Reflection Spectrum]

Next, the specular reflection spectrum of the sample prepared as described above was measured. For the measurement of the reflection spectrum, MSV-370 spectrometer manufactured by JASCO Corporation was used. The specular reflection spectrum of each sample is shown in FIG. 14.

As a result, the specular reflection spectrum of the tablet showed nearly the same shape as the spectrum of the coated film of the oligomer. The sample pressed under higher pressure exhibited higher reflectance.

In this context, the maximum reflectance of each sample was plotted as a function of the applied pressure as shown FIG. 15.

For the above prepared articles, the arithmetic average roughness $R_a$, which is a typical parameter of the surface roughness, was calculated. For the calculation, a laser microscope VK-9700 manufactured by Keyence Corporation and its analysis software were used to calculate the average value of 10 line roughness per 500 μm fixed length. Regarding the measurement results, FIG. 16 to FIG. 22 show the 3D image and the arithmetic average roughness $R_a$ measured by the laser microscope, and FIG. 23 shows the relationship between applied pressure and Ra.

From these measurement results, it can be seen that when the applied pressure is increased, the smoothness of the surface is increased. It can be seen that a tablet sample having a higher reflectance exhibited a smaller Ra value, i.e., higher smoothness.

As described above, it was confirmed that the metallic luster can be developed by the pressurization described in by this example.

[Rubbing]

Also, 0.2 g of the prepared 3 MeOT oligomer powder was sandwiched between two glass plates (0.5 cm×7.6 cm×5.2 cm), a 5-kg weight was placed on a glass plate, and the glass plate was reciprocated 50 times. In this case, the pressure was 253 g/cm².

As a result, the powder which was blackish brown before rubbing became goldlike tone film after rubbing. The photographs of the samples before and after the rubbing are shown in FIG. 24.

Further, specular reflection spectrum was measured for this goldlike film. The result is shown by the solid line in FIG. 25. As shown in this figure, it was possible to obtain a spectrum similar to the case (broken line) of a coating film (a film obtained by dissolving 3 MeOT oligomer powder in an organic solvent and then coating and drying it on the substrate). We quantitatively confirmed that it was a film showing a goldlike with a strong yellowness. The measurement conditions of this spectrum were an incident angle of 23 degree, an aperture of 0.1 mm square, and a standard sample was a vacuum evaporated aluminum film.

In addition, colorimetry (L*, a*, b*) was performed on this film. This result is shown in FIG. 26. The colorimetry uses a D65 light source, and the result is expressed by the CIE LAB color system (L*, a*, b*). In the figure, a* and b* represent hue. When a* value becomes positive, redness increases. When a* value becomes negative, greenishness increases. When b* value becomes positive, yellowness increases. When b* value becomes negative, blueishness increases. The measurement was carried out using spectrocolorimeter CM-600d (Konica Minolta Co., Ltd.) and color control software SpectraMagixNX (Konica Minolta Co., Ltd.) was used for data visualization. For comparison, the coating film is indicated by ○, and the 3 MeOT oligomer powder is indicated by ●.

As a result, the lightness and saturation of the 3 MeOT oligomer powder without gloss were small, whereas in the rubbing sample (▲) and the coating film (○), the lightness remarkably increased, and the saturation also increased in the first quadrant. In addition, comparing the rubbing sample with the coated film, it was confirmed that the saturation was a little lower though the hue was almost the same. This is probably because the rubbing sample shows higher diffuse reflection because the surface roughness is larger compared with the coated film, and as a result the yellowness of the glossy color is considered to be diminished.

Further, X-ray diffraction spectrum measurement was performed on this film. The result is shown in the solid line in FIG. 27. This measurement was performed by using the fully automatic horizontal multi-objective X-ray diffractometer SmartLab (Rigaku) and out-of-plane diffraction was measured. In the measurement by the out-of-plane method, information on the thickness direction of the layer can be obtained, and a peak is shown when there is a regular layer spacing in the thickness direction.

As a result, it was confirmed that with the dotted coating film, the (100) peak due to the edge-on lamella showing gold color (yellow when removing gloss) is extremely large and the (020) peak due to the face-on lamella showing magenta (red purple) color is small, leading to the coloration of gold-like tone. The interlayer distance of 1.13 nm from the (100) peak and the interlayer distance of 0.35 nm from the (020) peak were calculated from the Bragg equation, respectively.

On the other hand, in the diffraction pattern of the oligomer powder indicated by the broken line, when comparing the (100) peak and the (020) peak, it was found that the amount of the edge-on lamellae and that of the face-on lamellae were equal or more on the face-on lamellae. In this case, the color of the 3 MeOT oligomer powder is a subtractive color mixture of yellow and magenta, which is brown, in fact it is deep dark brown, so it is colored close to black. Moreover, in this powder, since the peak intensity is low, the number density of the lamellar structure is extremely small, indicating that there are many amorphous region in the powder. On the other hand, in the rubbing sample, the (100) peak is markedly higher, and also shows a sharp peak with a small half-value width as compared with the coated film, so that an edge-on lamella with a large crystal size is formed (See FIG. 28). That is, rubbing has the effect of increasing the number density of the edge-on lamellae and face-on lamella involved in powder samples, and in particular, it is considered that the gold-like tone has developed owing to an increase in number density and size of the edge-on lamellae.

As described above, it was confirmed that a metallic luster can be developed by rubbing according to this example.

[Invention According to Another Viewpoint]

By the way, regarding the development of a metallic luster, the invention was completed from another viewpoint. This will be described in detail below.

Metal is generally hard and is used not only for parts requiring mechanical strength such as household electric appliances and automobiles, but also every kind of items in our daily life such as furniture and miscellaneous articles since it has an excellent texture due to its lustrous properties. In particular, gold is popular because it can provide feeling of high quality. However, metals are expensive not only because the materials themselves are expensive, but also they are not easy to process, which makes them expensive.

As a means for solving the above problem, for example, there is a metal plating method in which a metal thin film is coated on the surface of an article such as a polymer or glass.

As a means for solving the above problem, there is a surface treatment technique such as a method of applying a coating solution containing metal fine particles and/or metal flakes to the surface of an article By using the above techniques, it is possible to produce an article having a metallic luster at low cost by costing its surface with a metal thin film or a paint containing metal particles (or flakes).

However, in the above metal plating method, there are more than a few restrictions on the material of an article to which the surface treatment is performed. Also, the above surface treatment methods take a high cost due to the unavoidable use of metals though they are less expensive than a method in which the entire body of an article is constructed by a metal. Particularly, in the paint to which the above-mentioned metal is added, there is a problem that the metal particles precipitate due to the difference in the specific gravity between the polymer binder and the metal in the paint, and unevenness is easy to occur in the coating film. Also, there is a problem that the metal is corroded and the gloss is lost. Furthermore, there is another problem that the coating film is heavy.

Therefore, it is believed that the above problem can be solved if non-metal substances showing a metallic luster are present. As a technique relating to the nonmetallic substances showing a metallic luster (gold-like and bronze-like luster), there is a technique described in WO/2014/021405, for example.

This non-metallic substance can be dissolved in a solvent, can be uniformly coated on glass•plastic film•metal•paper, the coating film shows golden tone or glossy bronze tone, and gloss persists for many years. It is the world's first substance to satisfy the above requirements regarding solubility, film-forming property, and stability.

However, in the technique described in the above patent documents, although it is possible to form a film showing a metallic luster, there is a problem with its strength.

In view of the above problems, an object of the present invention is to provide an article having a metallic luster with high strength, a toner and a method for manufacturing an article having a metallic luster.

An article having a metallic luster according to one aspect of the present invention for solving the above-mentioned problems is a metal lustrous mixture of the thiophene polymer with at least one of polyester resin, polycarbonate resin, polyvinylpyrrolidone resin, polystyrene resin, polymethyl methacrylate resin and styrene acrylic copolymer resin.

In this respect, although not limited, it is preferable that the weight of the thiophene polymer is in the range of 0.1 to 99.9 when the weight of the article is 100.

In this regard, although it is not limited, it is preferable that the article is a three-dimensional object.

A toner according to another aspect of the present invention is a metal-like lustrous toner in which the thiophene polymer is mixed with at least one of a polyester resin, a polycarbonate resin, a polyvinyl pyrrolidone resin, a polystyrene resin, a polymethyl methacrylate resin and a styrene acrylic copolymer resin.

In addition, in the present aspect, although not limited, it is preferable that the weight of the thiophene polymer is in the range of 0.1 to 99.9 when the weight of the article is taken as a base of 100.

A method for producing an article according to another aspect of the present invention is a method for producing a metal-like lustrous article, which comprises the steps of mixing the thiophene polymer with at least one of a polyester resin, a polycarbonate resin, a polyvinyl pyrrolidone resin, a polystyrene resin, a polymethyl methacrylate resin and a styrene acrylic copolymer resin in solvents, followed by the removal of the solvents in order to solidify the mixture.

In addition, in the present aspect, although not limited, the weight of the thiophene polymer is preferably in the range of 0.1 to 99.9 when the weight of the article is 100.

A coating solution (or paint) for producing a metal-like lustrous article according to another aspect of the present invention is a solution including the thiophene polymer, a solvent, and at least any one of a polyester resin, a polycarbonate resin, a polyvinylpyrrolidone resin, a polystyrene resin, a polymethyl methacrylate resin, and a styrene acrylic copolymer resin.

Further, a three-dimensional object according to another aspect of the present invention comprises a mixture of the thiophene polymer and at least any one of a polyester resin, a polycarbonate resin, a polyvinyl pyrrolidone resin, a polystyrene resin, a polymethyl methacrylate resin and a styrene acrylic copolymer resin.

The toner having a metallic luster according to another aspect of the present invention is a toner having a metallic luster, comprising the mixture of the thiophene polymer with at least any one of a polyester resin, a polycarbonate resin, a polyvinylpyrrolidone resin, a polystyrene resin, a polymethyl methacrylate resin and a styrene acrylic copolymer resin.

A method for producing an metal-like lustrous article is a method for producing a three-dimensional object having a metallic luster, which comprises the steps of mixing the thiophene polymer with at least one of polyester resin, polycarbonate resin, polyvinyl pyrrolidone resin, polystyrene resin, polymethyl methacrylate resin and styrene acrylic copolymer resin in a solvent, followed by the solidification by removing the solvent.

Further, a solution for producing an article having a metallic luster according to another aspect of the present invention is a solution containing the thiophene polymer, solvent, and at least any one of a polyester resin, a polycarbonate resin, a polyvinylpyrrolidone resin, a polystyrene resin, a polymethyl methacrylate resin and a styrene acrylic copolymer resin.

As described above, according to the present invention, it is possible to provide a metal-like article and a toner having high strength, and a method of manufacturing an article having a metallic luster.

Hereinafter, embodiments of the present invention will be described in detail with reference to the drawings. However, the present invention can be practiced in many different modes, and is not limited only to the specific examples of the embodiments and examples described below.

Embodiment 3

[Article]

FIG. 29 is a schematic view of an article having a metallic luster (hereinafter also referred to as "the article") according to this embodiment.

The article in this figure is a mixture of the thiophene polymer with at least one of a polyester resin, a polycarbonate resin, a polyvinylpyrrolidone resin, a polystyrene resin, a polymethyl methacrylate resin and a styrene acrylic copolymer resin. It is an example in which the article is formed on the substrate in the form of a film, but it is also possible to have a more stereoscopic and complicated shape as shown in FIG. 30, for example.

[Polyester Resin]

In the article, the polyester resin is a resin composed of a polycondensate of a polyvalent carboxylic acid and a polyhydric alcohol, and is not limited as far as the polyester resin follows the above definition, but polyethylene terephthalate, polytrimethylene terephthalate, polybutylene terephthalate, polyethylene naphthalate, polybutylene naphthalate, polycyclohexane dimethyl terephthalate, polytrimethylene naphthalate, polycyclohexane dimethylene terephthalate, polytotetramethylene naphthalate, and mixtures thereof, and the like can be exemplified.

In addition, in the article, the average molecular weight of the polyester resin is not limited as long as the mixture of polyester resin with the thiophene polymer develops a metal-like luster, but it is preferably from 1,000 to 1,000,000, more preferably from 3,000 to 100,000.

[Polycarbonate Resin]

In the article, the polycarbonate resin is a resin having a carbonate group as a constituent and is a resin which can be produced by bisphenol A and phosgene, for example. Further, in the real product, the average molecular weight of the polycarbonate resin is not limited as long as it has a metallic luster, but it is preferably from 1,000 to 1,000,000, more preferably from 3,000 to 100,000.

[Polyvinylpyrrolidone (PVP) Resin]

In the article, the polyvinylpyrrolidone resin is a resin obtained by polymerizing N-vinyl-2-pyrrolidone. In addition, in the article, the average molecular weight of the polyvinylpyrrolidone resin is not limited as long as it has a metallic luster, but it is preferably from 1,000 to 1,000,000, more preferably from 3,000 to 100,000.

[Polystyrene Resin]

In the article, polystyrene resin is a resin obtained by polymerizing styrene. In addition, in the article, the average molecular weight of the polystyrene resin is not limited as long as it has a metallic luster, but it is preferably from 1,000 to 1,000,000, more preferably from 3,000 to 500,000, furthermore desirably is 300000 or less.

[Polymethylmethacrylate Resin (Acrylic Resin)]

In the article, polymethylmethacrylate (PMMA) resin is a resin obtained by polymerizing acrylate ester. The average molecular weight of the polymethyl methacrylate resin is not limited as long as it has a metallic luster, but it is preferably from 1,000 to 1,000,000, more preferably from 3,000 to 500,000.

[Styrene Acrylic Copolymer Resin]

In the article, the styrene acrylic copolymer resin is a copolymer compound of acrylonitrile and styrene. The average molecular weight of the styrene-acrylic copolymer resin is not limited as long as it has a metallic luster, but it is preferably from 1,000 to 1,000,000, more preferably from 3,000 to 500,000.

[Thiophene Polymer]

In addition, "thiophene polymer" in the article is a polymer obtained by polymerization of two or more thiophenes bonded to each other, and is a compound represented by the following general formula.

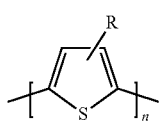

[Chemical formula 3]

In the above formula, R is a substituent and is not limited as long as it can impart a metallic luster to the film, but it is preferably an alkoxy group, an amino group, an alkyl group, a hydroxyl group, a hydroxyalkyl group, an aryl group, a cyano group, or a halogen atom. In addition, R may be one or two on one thiophene ring. In the thiophene polymer according to this embodiment, the above R of each thiophene may be the same or different. Furthermore, when the thiophene polymer is doped with anions, it exhibits a golden tone close to gold and copper and a copper color tone. As the anion, perchlorate ion, hexafluorophosphate ion, tetrafluoroborate ion, chloride ion, bromide ion, sulfate ion, acetate ion, nitrate ion, citrate ion, oxalate ion, paratoluenesulfonic acid ions, polystyrene sulfonate ions, and the like.

It is to be noted that "thiophene" is a heterocyclic compound containing sulfur and is a compound represented by the following general formula, as is clear from the above description. In the formula, the definition of R is the same as above.

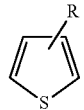

[Chemical formula 4]

In the above formula, when R is an alkoxy group, it is not limited, but the number of carbon atoms is preferably 1 or more and 8 or less, more specifically 3-methoxythiophene, 3,4-dimethoxy thiophene, 3-ethoxythiophene, 3-propoxythiophene, 3-butoxythiophene, 3-methoxy-4-methylthiophene, 3-ethoxy-4-methylthiophene, 3-butoxy-4-methylthiophene, 3,4-diethoxy thiophene, 3,4-ethylenedioxythiophene, 3,4-propylenedioxythiophene, and the like.

In the above formula, when R is an alkyl group, it is not limited, but the number of carbon atoms is preferably 1 or more and 12 or less, more specifically 3-methylthiophene, 3,4-dimethyl thiophene, 3-ethylthiophene, 3,4-diethylthiophene, 3-butylthiophene, 3-hexylthiophene, 3-heptylthiophene, 3-octylthiophene, 3-nonylthiophene, 3-decylthiophene, 3-undecylthiophene, 3-dodecylthiophene, 3-bromo-4-methylthiophene, and the like.

In the above formula, when R is an amino group, examples thereof include 3-aminothiophene, 3,4-diaminothiophene, 3-methylaminothiophene, 3-dimethylaminothiophene, 3-thiophene carboxamide, 4-(thiophene-3-yl) aniline and the like.

In addition, in the real product, the molecular weight of the "thiophene polymer" is not limited as long as it can be formed as a metal-like lustrous film, but the peak of the distribution of the weight average molecular weight determined by GPC measurement method is preferably in the range of 200 to 30000, more preferably in the range of 500 to 10000.

In the article, the weight of the thiophene polymer is preferably in the range of 0.1 to 99.9, more preferably 0.5 to 99, when the total weight of the article is taken as 100.

Also, in the article, the thiophene polymer is not limited as long as it can be prepared, thereby various methods can be adopted for its preparation. For example, the thiophene polymer can be prepared by chemical polymerization or electrochemical polymerization.

[Chemical Polymerization]

Here, the "chemical polymerization method" is a polymerization performed in at least one of a liquid phase and a solid phase using an oxidizing agent.

Specifically, this method includes (1) a step of polymerizing thiophene using an oxidizing agent to form a solution containing a thiophene polymer, and (2) a step of removing unreacted raw material and by-products from the solution containing the thiophene polymer to obtain a thiophene polymer powder.

First, in this method, (1) thiophene is polymerized using an oxidizing agent to prepare a solution containing the thiophene polymer. "Thiophene" and the obtained "thiophene polymer" used herein are those described above. As described above, the thiophene polymer is preferably in the range of a so-called oligomer, specifically, it is preferable to polymerize so that the distribution peak of the weight average molecular weight falls within a range of from 200 to 30,000.

In this step, the oxidizing agent is not limited as long as it is capable of producing a thiophene polymer, thereby various oxidizing agents can be used, for example, ferric salt, cupric salt, cerium salt, dichromic acid salts, permanganate, ammonium persulfate, boron trifluoride, bromate, hydrogen peroxide, chlorine, bromine and iodine, among which the ferric salt is preferred. It may be a hydrate. In addition, in this case, the kind of anion in the oxidant can also be adjusted appropriately and is not limited, and examples thereof include a chloride ion, a bromide ion, a citrate ion, an oxalate ion, a paratoluene sulfonate ion, a perchlorate ion, a hexafluorophosphate ion, a tetrafluoroborate ion and the like can be exemplified, and among them, it is preferable to use at least of perchlorate ion, hexafluorophosphate ion, tetrafluoroborate ion, chloride ion, bromide ion, and paratoluenesulfonate ion. Because metallic luster similar to gold color defined by numerical evaluation by colorimeter can be obtained. The reason why the metallic luster similar to gold color can be obtained is that when the anion listed above is doped into the thiophene polymer, it is stabilized by binding with a cationic radical site generated in the thiophene polymer, and contributes to the formation of a regular molecular orientation structure (formation of a lamellar crystal structure). In fact, it has been confirmed that these lamellar crystal structures stably exist when analyzing films having a metallic luster.

In this step, it is preferable to carry out the polymerization in solvents. The solvent to be used is not limited as long as it can sufficiently dissolve the above-mentioned oxidizing agent and thiophene and polymerize efficiently, but it is preferable that it is an organic solvent having high polarity and a certain degree of volatility. Preferred examples thereof include acetonitrile, nitromethane, γ-butyrolactone, propylene carbonate, nitromethane, 1-methyl-2-pyrrolidinone, dimethylsulfoxide, 2-butanone, tetrahydrofuran, acetone, methanol, anisole, chloroform, ethyl acetate, hexane, trichlorethylene, cyclohexanone, dichloromethane, chloroform, dimethylformamide, ethanol, butanol, pyridine, dioxane, and mixtures thereof and the like can be used, but acetonitrile, nitromethane, γ-butyrolactone, propylene carbonate is preferable because the thiophene polymer is soluble and easily forms a film having a better metallic luster.

In this step, the weight proportion of thiophene and oxidizing agent to the solvent can be appropriately adjusted and is not limited, but when the weight of the solvent is taken as 1, the weight of thiophene is 0.00007 or more and 7 or less More preferably 0.0007 or more and 0.7 or less, and in the case of iron perchlorate n hydrate, the weight is preferably 0.0006 or more and 6 or less, more preferably 0.006 or more and 0.6 or less.

In this step, the ratio of the thiophene and the oxidizing agent used is preferably 0.1 to 1,000, more preferably 1 to 100, when the weight of thiophene is taken as 1.

In addition, in this polymerization step, polymerization reaction may be initiated by adding oxidizing agent and thiophene to the solvent at once. Also two kinds of solutions are separately prepared: a solution prepared by adding thiophene to the solvent and a solution obtained by adding an oxidizing agent to the solvent, and these are added, polymerization reaction may be initiated by mixing these solutions.

In this method, it is preferable to remove the solvent to prepare the thiophene polymer powder. By doing so, it becomes possible to manufacture articles having a metallic luster dissolving the thiophene polymer powder and a polyester resin in a solvent, and by applying the resultant coating solution. In the case where a material containing the perchlorate ion, the hexafluorophosphate ion, the tetrafluoroborate ion, the chloride ion, the bromide ion, and the paratoluene sulfonate ion is used as the oxidizing agent, the anion is stably doped in the thiophen polymer and can maintain the metallic lustrous state.

[Electrolytic Polymerization]

Further, in the article, as described above, the thiophene polymer can also be produced by electrochemical polymerization. In the present embodiment, electrochemical polymerization is a method in which a substance (monomer), a precursor of a polymer, is dissolved in a solution containing a supporting electrolyte and then the monomer is electrochemically oxidized to form a solution insoluble polymer film.

Further, in the present embodiment, it is preferable to use a potential sweep method in the electrochemical polymerization. The potential sweep method is a treatment in which a pair of electrodes are immersed in a solution containing a supporting electrolyte and a bias potential is applied while changing the potential at a constant speed.

The solvent of the solution used in the present embodiment is not particularly limited, but in addition to water and alcohol, for example, solvent described in Akira Fujishima, Masao Aizawa, Toru Inoue, "Electrochemical Measurement Method", Gihodo Publishing, Vol. 1, page 107-114, 1984 can be employed. Mixed solvents of various solvents are also preferable. Furthermore, when an anionic surfactant such as sodium dodecylsulfate, a cationic surfactant such as dodecyltrimethylammonium bromide, and a nonionic surfactant such as polyoxyethylene lauryl ether are used, it is possible to obtain metallic luster similar to the gold color defined by numerical evaluation of a colorimeter.

The supporting electrolyte of the solution used in the present embodiment is an essential component in electrolysis and is preferably a component that is sufficiently dissolved in a solvent and has a cationic and anionic moieties that are difficult to be electrolyzed. It is preferable to use at least one of lithium salt, sodium salt, potassium salt, calcium salt, tetraalkylammonium salt, for example, in view of the cation. It is preferable to use at least one of halide, sulfate, nitrate, phosphate, perchlorate, tetrafluoroborate, hexafluorophosphate, for example, as far as anions are concerned. Although the concentration of the supporting electrolyte is not limited, it is preferably 0.001 M or more and not more than solubility, more preferably 0.01 M or more and 5 M or less.

In the present embodiment, the concentration of the thiophene monomer used in the electrochemical polymerization in the electrolytic solution is not limited, but it is preferably 0.1 mM or more and not more than solubility, more specifically 0.5 mM or more and 1 M or less.

Further, in this embodiment, in the electrochemical polymerization, three electrode system can be employed in which a working electrode, counter electrode, and reference electrode are immersed in an electrolysis cell containing a electrolysis cell containing, or a two electrode type cell using only a working and a counter electrodes can be adopted. Note that the three electrode system which can precisely control the electric potential of the electric conductor with respect to the reference electrode is more preferable in that it can produce an article having a metallic luster including a thiophene polymer with good reproducibility.

In any of the three-electrode system and the two-electrode system, the conductor as the working electrode is not limited as long as it is a material stable to electrode oxidation and reduction. For example, as described above, a transparent glass electrode coated with indium tin oxide (hereinafter abbreviated as "ITO") or tin oxide, a metal electrode, an alloy electrode such as stainless steel, or the like, a glassy carbon electrode, or the like can be suitably used. In addition to the above electrode material, a metal electrode such as stainless steel or a copper plate can be suitably used as the counter electrode. The reference electrode is not limited, for example, a silver/silver chloride electrode (Ag/AgCl electrode) or a saturated calomel electrode can be suitably used.

In the present embodiment, potential sweep between a positive potential and a negative potential is preferable for the potential sweep method in electrochemical polymerization. In this case, the negative potential limit is preferably in the range of −1.5 V or more to −0.01 V or less, more preferably in the range of −1.0 V or more to −0.1 V or less, more preferably −0.7 V Or more and −0.2 V or less. The positive potential limit is preferably in the range of +1.0 V or more and +3.0 V or less, more preferably in the range of +1.0 V or more and +2.0 V or less, more preferably in the range of +1.0 V or more and +1.5 V or less.

In the present embodiment, the potential sweep rate in the potential weep method is not limited as long as an article having a metallic luster can be manufactured, but it is in the range of 0.1 mV/second or more and 10 V/second or less, more preferably 1 mV/second or more and 1 V/second or less, and further preferably 2 mV/second or more and 300 mV/second or less.

The time for electrochemical polymerization is not limited as long as an article having a metallic luster can be deposited on the electrode, but it is preferably carried out within the range of 1 second to 5 hours, and more preferably in the range of 10 seconds to 1 hour when the applied potential is in the range described above.

The temperature of electrolysis is not limited as far as an article having a metallic luster can be deposited by electrochemical polymerization, but it is preferably in the range of −20° C. to 60° C.

In addition, this electrolysis is a reaction which is hardly disturbed by the component substances in the air and proceed at a relatively low potentials, and therefore, for examples, the contamination by the electrolytic products of oxygen, it can be performed in the air. From the viewpoint of avoiding the possibility of contaminating the generated film such as oxidation of dissolved oxygen in the electrolytic solution, it is preferable to carry out in a nitrogen gas or argon gas atmosphere, but there is almost no worry of contamination. However, when electrochemical polymerization is carried out, bubbling with an inert gas (nitrogen gas or argon gas) is also useful because there is a fear that the presence of a large amount of oxygen in the solution may affect the electrode reaction.

[Production Method]

The article is prepared by mixing of a thiophene polymer synthesized by the chemical polymerization or the electrochemical polymerization described above with at least of a polyester resin, a polycarbonate resin, a polyvinyl pyrrolidone resin, a polystyrene resin, a polymethyl methacrylate resin and a styrene acrylic copolymer resin. In this mixing, it is preferable to use a solvent. The solvent is not particularly limited as long as it can mix a thiophene polymer with at least one of the above polyester resin, polycarbonate resin, polyvinylpyrrolidone resin, polystyrene resin, polymethyl methacrylate resin and styrene acrylic copolymer resin. It is possible to use, for example, nitromethane, γ-butyrolactone, acetonitrile, propylene carbonate, dimethyl sulfoxide, N-methyl-2-pyrrolidone and mixtures thereof can be used.

The ratio of at least one of the polyester resin, the polycarbonate resin, the polyvinyl pyrrolidone resin, the polystyrene resin, the polymethyl methacrylate resin and the styrene acrylic copolymer resin to the thiophene polymer may be in the above-mentioned range. The weight ratio of the mixture is not limited as long as it is dissolvable and can be appropriately adjusted as the mixture can be dissolved in the solvent provide the solution with the required viscosity. For example, when the total weight of the polyester resin and the thiophene polymer is 1, it is preferably 0.1 or more and 500 or less.

Then, by applying the above-prepared solution on a plate or the like, forming it into a desired shape, and drying it by removing the solvent, an article maintaining a desired three-dimensional shape can be formed. Of course, the three-dimensional shape includes a film, and the strength of this film has extremely high as is clear from the examples described later.

As described above, in the article, even if a thiophene polymer is mixed with at least one of a polyester resin, a polycarbonate resin, a polyvinyl pyrrolidone resin, a polystyrene resin, a polymethyl methacrylate resin and a styrene acrylic copolymer resin, the mixture does not lose a metallic luster, and an article with higher strength can be provided.

Although the reason why the thiophene polymer shows a metallic luster in real products is only speculative, it is considered that the thiophen units constituting the thiophene polymer are regularly oriented and reflect a specific wavelength. This is also supported by the fact that the film containing the prepared thiophene polymer shows a sharp peak in X-ray diffraction pattern.

However, in view of the above background, it is considered that when another tipe of resin is mixed with a thiophene polymer, the above-mentioned special ordered arrangement is usually disturbed and a structure exhibiting a metallic luster cannot be realized. However, in the article, it was found that the mixture does not lose its metallic luster by using at least one of polyester resin, polycarbonate resin, polyvinyl pyrrolidone resin, polystyrene resin, polymethyl methacrylate resin and styrene acrylic copolymer resin among various resins, even at least one of polyester resin, polycarbonate resin, polyvinyl pyrrolidone resin, polystyrene resin, polymethyl methacrylate resin and styrene acrylic copolymer resin enters is mixed with a thiophene polymer. In addition, the molecular weight of at least one of polyester resin, polycarbonate resin, polyvinylpyrrolidone resin, polystyrene resin, polymethyl methacrylate resin and styrene acrylic copolymer resin can be adjusted as appropriate. Also, by adjusting the quantity of solvent to be mixed, it is possible to adjust the viscosity of the solution.

[Toner]

Incidentally, the article according to this embodiment is a mixture of a thiophene polymer with at least any of a polyester resin, a polycarbonate resin, a polyvinyl pyrrolidone resin, a polystyrene resin, a polymethyl methacrylate resin and a styrene acrylic copolymer resin. The polyester resin itself is used, for example, as a binder for toners used in printers, copying machines and the like, and this article can be used as a toner for printers and the like. In the case of using the article as a toner, it can be realized by preparing fine particles of a mixture of the polyester resin and the thiophene polymer. As a method of preparing fine particles, an article obtained by mixing the polyester resin and the thiophene polymer can be crushed to have a desired particle size. Alternatively, the viscosity of the solution prepared above is reduced, then the droplets of the solution having a size slightly larger than a desired particle size are formed by spraying or the like using an inkjet nozzle, and the solvent is removed from the droplets to obtain dried particles. Of course, other resins, polycarbonate resins, polyvinyl pyrrolidone resins, polystyrene resins, polymethyl methacrylate resins and styrene acrylic copolymer resins can be used as far as possible.

As described above, according to the present embodiment, it is possible to obtain an article having a metallic gloss with higher strength.

Example

Here, with respect to the article according to the above embodiment, the product was actually manufactured and the effect was confirmed. This will be described in detail below.

[Thiophene Polymer]

First, the monomer of 3-methoxythiophene (hereinafter referred to as "3 MeOT") was distilled before polymerization to remove impurities. 5.418 g of the distilled monomer was added to 475 ml of acetonitrile and stirred with a propeller stirrer for 30 minutes while nitrogen was bubbled to prepare a monomer solution of 0.1 mol/l.

Next, 48.02 g of iron (III) perchlorate n hydrate ($Fe(ClO_4)_3 \cdot nH_2O$) as an oxidizing agent was added to 475 ml of acetonitrile, and the mixture was ultrasonically dispersed for 20 minutes to dissolve it, 0.2 mol/l of the oxidant solution.

Then, the monomer solution was placed in a polymerization cell, and the oxidizing agent solution was slowly dropped into the monomer solution, followed by the polymerization for 2 hours. By this operation, a 3MeOT oligomer exhibiting deep blue color was obtained.

Then, a solution containing 3MeOT oligomer after the polymerization was placed in a glass filter, and suction filtration was carried out. The residue remaining on the filter of the glass filter was washed with methanol and suction filtration was repeated.

After that, the residue after washing was placed in a vacuum dryer and vacuum dried at 50° C. for 90 minutes to dry the oligomer.

[Mixing of Thiophene Polymer and Polyester Resin]

The 3MeOT oligomer prepared as above was mixture with polyester (PES) resin (Vylon 200, Toyobo Co., average molecular weight; 17000) and solvent (nitromethane or γ-butyrolactone, GBL) in the amounts shown in Table 1 and Table 2, and the mixture was stirred. In the following table, 3 MeOT:PES represents the weight ratio of the oligomer and the polyester, and its notation is hereinafter used as sample name. Thus, 1:0 represents a resin-free, oligomeric only solution.

TABLE 1

| The composition ratio of the nitromethane solution | | | |
|---|---|---|---|
| 3MeOT:PES | 3MeOT oligomer | Polyester | Nitromethane |
| 1:0 | 10 mg (1 wt %) | — | 0.868 g |
| 1:1 | 10 mg (1 wt %) | 10 mg (1 wt %) | 0.868 g |
| 1:2 | 10 mg (1 wt %) | 20 mg (2 wt %) | 0.868 g |
| 1:4 | 10 mg (1 wt %) | 40 mg (4 wt %) | 0.868 g |
| 1:8 | 10 mg (1 wt %) | 80 mg (8 wt %) | 0.868 g |

TABLE 2

| The composition ratio of the GBL solution | | | |
|---|---|---|---|
| 3MeOT:PES | 3MeOT oligomer | Polyester | GBL |
| 1:0 | 10 mg (1 wt %) | — | 0.885 g |
| 1:1 | 10 mg (1 wt %) | 10 mg (1 wt %) | 0.885 g |
| 1:2 | 10 mg (1 wt %) | 20 mg (2 wt %) | 0.885 g |
| 1:4 | 10 mg (1 wt %) | 40 mg (4 wt %) | 0.885 g |
| 1:8 | 10 mg (1 wt %) | 80 mg (8 wt %) | 0.885 g |

[Manufacture of Articles]

The above solution was dropped with a syringe onto a well-washed glass substrate and film formation was performed. The coating film prepared from the nitromethane coating solution was dried at room temperature for 1 hour (20° C., 40% RH), and the coating film prepared from GBL coating solution was dried for 30 minutes (45° C.) with a constant-temperature fan dryer.

FIG. 31 shows a film prepared from the nitromethane coating solution listed in Table 1. The ratio in the figure is the mass ratio of 3 MeOT:PES. Also, 1:0 is a film of only oligomers not containing PES.

In addition, FIG. 32 shows films prepared from the GBL solutions listed in Table 2. The ratio in the figure is the mass ratio of 3MeOT:PES. In addition, 1:0 is a film of only oligomers not containing PES.

[Specular Reflection Spectrum]

Here, FIG. 33 and FIG. 34 show specular reflection spectra of the coated films prepared from the solutions of Tables 1 and 2 with a microscopic ultraviolet-visible near-infrared spectrophotometer (MSV-370, manufactured by JASCO Corporation). The wavelength interval was 0.5 nm and the aperture size was 100×100 μm.

According to the specular reflection spectra of the coating film prepared from the nitromethane coating solution shown in FIG. 33, it was confirmed that the coating film showed a slight decrease in reflectance with increasing the polymer resin but no shift in the rising wavelength was observed.

Further, it was confirmed that the coating films prepared from the GBL Coating solution shown in FIG. 34 had an improved reflectance by increasing the amount of the polymer resin. In addition, since the rising wavelength is shifted to a short wavelength with increasing the amount of the polymer resin, it was found that the color tone can be changed by adding the resin.

[Colorimetric Data]

The results of colorimetry of the film using a spectrocolorimeter (CM-600 d, manufactured by Konica Minolta) are shown in the following Tables 3 and 4. In this case, colorimetry was carried out under the conditions that the light source was D65, the viewing angle was 10 degrees, and the reflectance included specular reflection.

FIG. 35 and FIG. 36 are diagrams showing the relationship between L*, a*, and b* (CIE1976) in color space (www.konicaminolta.jp/instruments/knowledge/color/part1/07.html).

TABLE 3

| Result of colorimetry of coating film prepared from nitromethane solution | | | |
|---|---|---|---|
| 3MeOT:PES | L* | a* | b* |
| Deposition gold | 87.56 | 9.32 | 38.05 |
| 1:0 | 37.57 | 9.47 | 36.51 |
| 1:1 | 39.18 | 5.08 | 26.74 |
| 1:2 | 37.72 | 7.77 | 31.84 |

TABLE 3-continued

Result of colorimetry of coating film
prepared from nitromethane solution

| 3MeOT:PES | L* | a* | b* |
|---|---|---|---|
| 1:4 | 37.76 | 5.88 | 27.01 |
| 1:8 | 37.78 | 4.84 | 28.16 |

TABLE 4

Result of colorimetry of coating film prepared from GBL solution

| 3MeOT:PES | L* | a* | b* |
|---|---|---|---|
| Deposition gold | 87.56 | 9.32 | 38.05 |
| 1:0 | 43.5 | 2.98 | 26.19 |
| 1:1 | 41.24 | 1.61 | 19.6 |
| 1:2 | 39.45 | −0.58 | 18.89 |
| 1:4 | 37.77 | −0.46 | 16.39 |
| 1:8 | 38.77 | −0.26 | 17.09 |

Also, the values compared with those of the gold film prepared by vacuum evaporation are shown in Table 5 and Table 6. Note that $\Delta E^*ab$ represents a color difference (distance in color space). The difference in $a^*(\Delta a^*)$, $b^*(\Delta b^*)$, and $L^*(\Delta L^*)$ between these coating film and the evaporated gold film is shown in FIG. 37 and FIG. 38 in the case of nitromethane coating solution and GBL coating solution, respectively. Also, color difference between the coating films and the evaporated gold film is shown in FIG. 39 and FIG. 40 in the case of nitromethane coating solution and GBL coating solution, respectively.

TABLE 5

Color difference between between film of nitromethane
solvent and evaporated gold film

| 3MeOT:PES | $\Delta E^*ab$ | $\Delta L^*$ | $\Delta a^*$ | $\Delta b^*$ |
|---|---|---|---|---|
| 1:0 | 50.01 | −49.99 | 0.15 | −1.54 |
| 1:1 | 49.86 | −48.38 | −4.24 | −11.31 |
| 1:2 | 50.25 | −49.84 | −1.55 | −6.21 |
| 1:4 | 51.13 | −49.8 | −3.44 | −11.04 |
| 1:8 | 50.95 | −49.78 | −4.48 | −9.89 |

TABLE 6

Color difference between coating film
of GBL solvent and evaporated gold film

| 3MeOT:PES | $\Delta E^*ab$ | $\Delta L^*$ | $\Delta a^*$ | $\Delta b^*$ |
|---|---|---|---|---|
| 1:0 | 46.07 | −44.06 | −6.34 | −11.86 |
| 1:1 | 50.46 | −46.32 | −7.72 | −18.45 |
| 1:2 | 52.72 | −48.11 | −9.9 | −19.16 |
| 1:4 | 55.17 | −49.79 | −9.78 | −21.66 |
| 1:8 | 53.96 | −48.79 | −9.58 | −20.96 |

[Measurement of Mechanical Strength]

Next, the mechanical property of the coating film was evaluated based on the scratch hardness (JIS 5600-5-4). Table 7 and Table 8 show the hardness of the hardest pencil that did not have scratch marks on the coating film using pencils (product name: High-uni) produced by Mitsubishi Pencil High Co.

TABLE 7

Scratch hardness test of paint film
made from nitromethane solution

| 1:0 | 1:1 | 1:2 | 1:4 | 1:8 |
|---|---|---|---|---|
| B | H | H | 6H | 6H |

TABLE 8

Table 7 Scratch hardness test of
paint film made from GBL solution

| 1:0 | 1:1 | 1:2 | 1:4 | 1:8 |
|---|---|---|---|---|
| B | F | H | 6H | 6H |

As a result, by increasing the addition amount of the polymer resin, the strength of the coating film was improved.

A coating solution was prepared by mixing a 3-methoxythiophene oligomer exhibiting a metallic luster and a polyester resin and applied on a substrate to obtain a metal-like lustrous film having excellent mechanical strength without losing gold color tone.

[Creating 3D Shape]

By adjusting the viscosity of the prepared coating solution, an article having a three-dimensional shape can be produced in addition to a film. FIG. 41 is a photograph showing an example of an article having a three-dimensional shape instead of a film. As shown in this drawing, it is possible to obtain an article having a three-dimensional shape with high strength.

[Combination with Other Resins: Preparation of Mixed Coating Solution of the Thiophene Polymer and Resin]

As in the case of the above-mentioned PES, a coating solution was prepared by combining the thiophene polymer with other resins. Specifically, 10 mg of various resins shown in the following Table 9 were completely dissolved in 1.0 g of γ-butyrolactone (hereinafter referred to as "GBL") or 1.0 g of nitromethane, then 10 mg of the prepared thiophene polymer were added to the resin solution while stirring.

TABLE 9

| Notation | Resin | Company | Average molecular weight | Solvent |
|---|---|---|---|---|
| PES-N | Polyester PES (Byron 200) | Toyobo | 170,000 | Nitromethane |
| PES-G | Polyester PES (Byron 200) | Toyobo | 170,000 | GBL |
| PC | Polycarbonate PC (Panlite) | Teijin | 65,000 | GBL |
| PVP | Polyvinylpyrrolidone PVP | Aldrich | 10,000 | GBL |
| PS | Polystyrene PS | Aldrich | 280,000 | GBL |
| PMMA | Polymethylmethacrylate PMMA | Aldrich | 350,000 | GBL |
| StAc | Styrene acrylic copolymer StAc | Mitsui Chemicals | 340,000 | GBL |

[Combination of the Thiophene Polymer with Other Resins: Film Preparation]

Then, the coating solution prepared as above was dropped with a syringe onto a well-washed glass substrate and the coating layer was formed, and the coating layer was dried for 1 hour (60° C.) in a constant temperature warm air dryer, resulting the coating films.

In any of the combinations cases, the film thickness was about 18 μm.

FIG. 42 shows the photographs of the coating films prepared above and a coating film not containing a resin as a comparative example. In the figure, the coating film (nitromethane solvent) not containing a resin as a comparative example, the coating film (GBL solvent) not containing resin as a comparative example, PES-N, and PES-G are shown in order from the upper left in the figure. In the figure, PC, PVP, PS, PMMA, and StAc are shown in order from the left in the lower row, respectively. For PS, PMMA, and StAc, the rear side of the film developed gold color, and therefore, the photograph was taken from the rear side of the film.

[Combination of the Thiophene Polymer with Other Resins: Reflection Spectrum]

FIG. 43 to FIG. 45 show the reflection spectra measured using a spectrocolorimeter (CM-600 d manufactured by Konica Minolta). Measurement was carried out under the conditions that the light source was D65, the viewing angle was 10 degrees, and the reflectance included specular reflection (SCI mode, i.e., total reflection). FIG. 43 shows the total reflection spectra of the resin-free film and the PES-N film prepared from the nitromethane solution. FIG. 44 shows total reflection spectra of a resin-free film PES-G film, PC film and PVP film prepared from the GBL solution. FIG. 45 shows total reflection spectra of the resin-free film, the PES film, the PMMA film and the StAc film prepared from the GBL solution.

[Spectrophotometry]

Next, using the above-described spectrocolorimeter, colorimetric measurement of the gold-colored surface of the films shown in the above figure was performed. The light source was D65, the viewing angle was 10 degrees, and the colorimetry was carried out in the SCI mode in which the reflectance includes specular reflection, i.e., total reflection mode. And the value of L* represents lightness. The values of a* and b* stand for hue and saturation. These L*, a*, and b* values are based on the standards of JIS Z8781-4: 2013. The L*, a*, and b* values obtained by colorimetry is shown in the following Table 10, and their graphical presentation are shown in FIG. 46 to FIG. 48. In FIG. 46, ● indicates an evaporated gold film, ■1 indicates a gold-like film containing no resin prepared from a nitromethane solution, and the ■2 indicates a PES-N film. In FIG. 47, ● indicates an evaporated gold film, ■1 indicates a gold-like color film containing no resin prepared from a GBL solution, ■2 indicates PES-G film, ■3 indicates PC film, ■4 indicates PVP film. In FIG. 48 ● indicates an evaporated gold film, ■1 indicates a gold color film containing no resin prepared from a GBL solvent, ■2 indicates a PS film, ■3 indicates PMMA film, ■4 indicates StAc film.

TABLE 10

| Film | L* | a* | b* |
|---|---|---|---|
| Evaporated gold film | 87.56 | 9.32 | 38.05 |
| gold-metallic film preparation not containing resin made from nitromethane solvent | 37.57 | 9.47 | 36.51 |
| gold-metallic film preparation not containing resin made from GBL solvent | 43.5 | 2.98 | 26.19 |
| PES-N | 39.18 | 5.08 | 26.74 |
| PES-G | 41.24 | 1.61 | 19.60 |

TABLE 10-continued

| Film | L* | a* | b* |
|---|---|---|---|
| PC | 41.26 | 9.92 | 40.11 |
| PVP | 32.9 | 10.03 | 19.10 |
| PS (rear side which is a glass bonding surface) | 32.3 | 8.49 | 24.31 |
| PMMA (rear side which is a glass bonding surface) | 43.51 | 6.96 | 31.35 |
| StAc (rear side which is a glass bonding surface) | 35.19 | 8.41 | 27.31 |

Next, in order to compare the color of the gold-like film obtained here and the color of the evaporated gold film, the color difference ΔE*ab with reference to the colorimetric value of the evaporated gold film is listed in the following Table 11. This table also involves the difference in L*($\Delta$L*), a*($\Delta$a*), and b*($\Delta$b*) between the gold-like film and the evaporated gold film. Also, their graphical presentation is shown in FIG. 49 to FIG. 51. The color difference $\Delta$E*ab is the distance from the reference color (evaporated gold film) in the L* a* b* color space, and is given by the following formula. FIG. 49 shows the color difference from the evaporated gold film. In the figure, ● indicates the gold evaporated film, ■1 indicates the gold coloring film not containing the resin prepared from the nitromethane solution, and ■2 indicates the PES-N film. Also, FIG. 50 also shows the color difference from the evaporated gold film. In FIG. 50, ● indicates the gold evaporated film, ■1 indicates the gold-like film formed from the GBL solution and not containing the resin, ■2 indicates the PES-G film, ■3 indicates PC film, and ■4 indicates PVP film. In FIG. 51, ● indicates the evaporated gold film, ■1 indicates the gold color film not containing the resin prepared from the GBL solution, ■2 indicates the PS film, ■3 indicates the PMMA film, and ■4 indicates the StAc film.

$$\Delta E^*ab = \{(\Delta L^*)^2 + (\Delta a^*)^2 + (\Delta b^*)^2\}^{1/2} \quad \text{[Formula 1]}$$

TABLE 11

| Coating film | $\Delta$E*ab | $\Delta$L* | $\Delta$a* | $\Delta$b* |
|---|---|---|---|---|
| PES-N | 49.86 | −48.38 | −4.24 | −11.31 |
| PES-G | 50.46 | −46.32 | −7.72 | −18.45 |
| PC | 46.35 | −46.30 | 0.60 | 2.06 |
| PVP | 57.86 | −54.66 | 0.71 | −18.95 |
| PS | 56.94 | −55.25 | −0.83 | −13.74 |
| PMMA | 44.62 | −44.05 | −2.36 | −6.7 |
| StAc | 53.46 | −52.37 | −0.91 | −10.74 |

Next, comparison was made between the resin-containing films and a film containing no resin. Specifically, in order to compare the color of the films obtained above and the film not containing the resin, the color difference ΔE*ab with reference to a colorimetric value of a film prepared only with a thiophene polymer is listed in Table 12. This table also involves the difference in L*($\Delta$L*), a*($\Delta$a*), and b*($\Delta$b*) between the resin-containing film and the film not containing the resin. Also, their graphical presentation is shown in FIG. 55. FIG. 52 shows the color difference from the evaporated gold film. In the figure, ● indicates the evaporated gold film, ■1 indicates a gold-like film not containing a resin prepared from a nitromethane solution, ■2 indicates a PES-N film. Also, FIG. 53 also shows the color difference from the evaporated gold film. In the figure, ● indicates the evaporated gold film, ■1 indicates the gold-like film not containing the resin prepared from the GBL solvent, ■2 indicates the PES-G film, ■3 indicates PC film, and ■4 indicates PVP film. In FIG. 54, ● indicates a evaporated gold film, ■1 indicates a gold-like film not containing a resin prepared from a GBL solution, ■2 indicates a PS film, ■3 indicates a PMMA film, and ■4 indicates a StAc film.

TABLE 12

| Coating film | ⊿E*ab | ⊿L* | ⊿a* | ⊿b* |
|---|---|---|---|---|
| PES-N | 10.84 | 1.61 | −4.40 | −9.77 |
| PES-G | 7.11 | −2.26 | −1.38 | −6.59 |
| PC | 15.71 | −2.23 | 6.94 | 13.92 |
| PVP | 14.57 | −10.60 | 7.05 | −7.09 |
| PS | 12.61 | −11.19 | 5.51 | −1.88 |
| PMMA | 6.51 | 0.01 | 3.98 | 5.16 |
| StAc | 9.98 | −8.30 | 5.42 | 1.12 |

[Formation of Gold-Like Films when the Amount of Resin Added is Changed]

Interestingly, a similar gold-like luster was confirmed in the coating film when the addition amount of the resin was increased to 8 times or more with respect to the oligomer. The results are shown below.

[Preparation]

The thiophene polymer was prepared in the same manner as in the above examples. Further, 80 mg of various resins shown in the following Table 13 were completely dissolved in 1.0 g of GBL, and then 10 mg of the prepared 3 MeOT oligomer was mixed with the solution, followed by stirring. Then, the above solution was dropped onto a well-washed glass substrate using a syringe, and the coating layer was dried for 1 hour at 60° C. in a constant temperature warm air drier. The film thickness was about 50 μm.

TABLE 13

| Notation | Resin | Company | Average molecular weight | Solvent |
|---|---|---|---|---|
| PES-G | Polyester PES (Byron 200) | Toyobo | 170,000 | GBL |
| PS | Polystyrene PS | Aldrich | 280,000 | GBL |
| PMMA | Polymethylmethacrylate PMMA | Aldrich | 350,000 | GBL |
| StAc | Styrene acrylic copolymer StAc | Mitsui Chemicals | 340,000 | GBL |

FIG. 55 shows the photographs of the films prepared above and a film containing no resin (dried at 60° C.). Note that in the case of PS, PMMA, StAc, the bonding surface (rear surface) with the glass substrate are taken.

[Specular Reflection Spectrum]

FIG. 56 shows the specular reflection spectra of the free surface of PES-G and the rear side (back surface) of the PS, PMMA, and StAc films prepared as above. These spectra were taken by using a microscopic ultraviolet-visible near-infrared spectrophotometer MSV-370 manufactured by Mitsubishi Chemical Corporation). Comparing the results of this figure with the results in FIG. 44 and FIG. 45, it was confirmed that a gold-like luster can be developed even when the resin is excessively mixed with respect to the thiophene oligomer, since there is no difference in rising wavelength and reflectance.

[Spectrophotometry]

Next, the values of L*, a*, and b* of each film are shown in Table 14 below. Also, the graphical presentation of L*, and the relationship between a* and b* are shown in FIG. 57. As a result, any of the resin films have values close to those of the evaporated gold film, but the values of a* and b* are somewhat lower than those of the evaporated gold film, indicating that the resin films have greater greenness and blueness. In comparison with the results in Table 10, there was not much difference in color tone even when the amount of resin was increased.

In the figure, ● indicates the evaporated gold film, ■1 indicates the gold-like film not containing resin prepared from the GBL solution, ■3 indicates the PES-G film, ■3 indicates the PS film, and ■4 indicates the PMMA film, ■5 indicates a StAc film.

TABLE 14

| Film | L* | a* | b* |
|---|---|---|---|
| Evaporated gold film | 87.56 | 9.32 | 38.05 |
| Film not containing resin prepared from GBL solvent | 43.5 | 2.98 | 26.19 |
| PES | 40.86 | 2.23 | 19.15 |
| PS | 38.8 | 4.8 | 27.07 |
| PMMA | 43.59 | 4.09 | 19.31 |
| StAc | 44.62 | 8.26 | 31.92 |

Next, in order to compare the color of the gold-like lustrous film with that of the evaporated gold film, the color differences ΔL*, Δa*, Δb* with reference to the colorimetric values of the evaporated gold film are shown in Table 15 below. Also, their graphical presentation is shown in FIG. 58. In this figure, ● indicates the evaporated gold film, ■1 indicates the gold-like lustrous film prepared from the GBL solution and not containing the resin, ■2 indicates the PES film, ■3 indicates the PS film, ■4 indicates the PMMA film, and ■5 indicates the StAc film.

TABLE 15

| Coating film | ⊿E*ab | ⊿L* | ⊿a* | ⊿b* |
|---|---|---|---|---|
| Film not containing resin prepared from GBL solvent | 32.71 | −29.12 | −10.96 | 10.08 |
| PES | 33.98 | −31.76 | −11.71 | 3.05 |
| PS | 36.71 | −33.82 | −9.14 | 10.96 |
| PMMA | 30.83 | −29.04 | −9.85 | 3.2 |
| StAc | 32.65 | −28 | −5.68 | 15.81 |

Next, in order to compare the color of the gold-like lustrous film with that of the film not containing the resin, the color differences ⊿L*, ⊿a*, and ⊿b* with reference to the colorimetric values of the film not containing the resin are shown in the following Table 16. And the results plotted are shown in FIG. 59. In this figure, ● indicates the gold-like lustrous film prepared from the GBL solution and not containing the resin, ■1 the PES film, ■2 the PS film, ■3 the PMMA film, and ■4 indicates a StAc film, respectively.

TABLE 16

| Coating film | ⊿E*ab | ⊿L* | ⊿a* | ⊿b* |
|---|---|---|---|---|
| PES | 7.55 | −2.63 | −0.75 | −7.04 |
| PS | 5.12 | −4.7 | 1.82 | 0.88 |
| PMMA | 6.97 | 0.09 | 1.11 | −0.688 |
| StAc | 7.87 | 1.13 | 5.27 | 5.73 |

[X-Ray Diffraction Spectrum]

Here, X-ray diffraction analysis was carried out on the free surface of the PES film which exhibited a gold-like luster and the rear surface of the PMMA film, and the findings on the presence or absence of the crystalline structure (lamellar structure) attributed to the thiophene polymer were obtained. Measurement was carried out by a thin film method using SmartLab manufactured by Rigaku Corporation. In this case, the film thickness was about 50 μm.

FIG. 60 shows the XRD patterns of the above two films. A sharp peak was confirmed in the vicinity of 7.79 degrees in both of the patterns, and it was found that the lamellar crystal was present in the films and the lamellar interlayer distance was 1.13 nm.

[X-Ray Photoelectron Spectroscopy (XPS)]

From the X-ray photoelectron spectroscopic analysis, information on the constitute elements and their amounts on the film surface (up to about 2.5 nm depth) were obtained. For the measurement, PHI Quantera II manufactured by ULVAC-PHI Inc. was used, and the X-ray source was a monochromated Al (1486.6 eV).

FIG. 61 shows the wide scan XPS spectra. According to these spectra, only peaks of oxygen O, carbon C, chlorine Cl and sulfur S were detected in both PES and PMMA.

Also, narrow scan spectra in the region of S2p and Cl2p are shown in FIG. 62 and FIG. 63. Signal of sulfur derived from the thiophene ring and chlorine derived from the perchlorate of the dopant was clearly observed within the depth of 2.5 nm for both of the PES surface and the PMMA rear surface where gold-like luster is developed. That is, it was found that the thiophene polymer was present on the outermost surface and the outermost rear surface of the films with a thickness of 50 μm, and it was found that the lamellar crystallites formed by the thiophene polymer develops a golden tone. The atomic concentrations of chlorine and sulfur obtained from the XPS spectra are shown in Table 17 below. From these atomic concentration data, it was found that the thiophene polymer obtained in this example was doped with about 3 perchlorate ions per 10 units of thiophene ring.

TABLE 17

| Sample | Cl(atomic %) | S(atomic %) | Dope rate of perchlorate ion |
|---|---|---|---|
| PES | 2.6 | 8.7 | 29.90% |
| PMMA | 2.7 | 9.7 | 27.80% |

INDUSTRIAL APPLICABILITY

The present invention has industrial applicability as an article having a metal-like luster and a method for producing the same.

The invention claimed is:

1. A method for producing an article having a luster of gold, comprising steps of: (A) providing a powder containing at least one thiophene polymer; and (B) pressurizing the powder in a state in which the powder is not mixed with solvents or other materials or substances, wherein in step (B), the powder is pressurized by a pressure force between 10 kg/cm$^2$ and 1.0*10$^5$ kg/cm$^2$.

2. The method according to claim 1, wherein the powder provided in step (A) is produced by chemical polymerization or electrochemical polymerization.

3. The method according to claim 1, further comprising a step of loading the powder into a mold, wherein
   in step (B), the powder is pressurized in the mold, and
   the article is formed from the powder pressurized powder.

4. The method according to claim 1, further comprising a step of loading the powder onto a base member, wherein
   in step (B), the powder is pressurized against the base member, and
   the article is formed by pressurizing the powder against the base member.

5. A method for producing an article having a luster of gold, comprising steps of:
   (A) providing a powder containing at least one thiophene polymer; and
   (B) pressurizing the powder in a state in which the powder is not mixed with solvents or other materials or substances, wherein
   in step (B), the powder is rubbed by a pressing member generating a resultant force of a first pressure force having a direction substantially perpendicular to a surface of the powder and a second pressure force having a direction substantially parallel to the surface of the powder.

6. The method according to claim 5, wherein the powder provided in step (A) is produced by chemical polymerization or electrochemical polymerization.

7. The method according to claim 5, wherein the first pressure force is between 3 g/cm$^2$ and 500 g/cm$^2$.

8. The method according to claim 5, further comprising a step of loading the powder onto a base member, wherein
   in step (B), the powder is pressurized against the base member, and
   the article is formed by pressurizing the powder against the base member.

9. A method of producing a printed matter having a luster of gold, comprising steps of: (A) providing a toner comprising a powder containing at least one thiophene polymer; (B) loading the toner onto a base material in a state in which the toner is not mixed with solvents or other materials or substances; and (C) pressurizing the toner against the base member whereupon the luster of gold is generated on a surface of the printed matter, wherein in step (C), the powder is pressurized by a pressure force between 10 kg/cm$^2$ and 1.0*10$^5$ kg/cm$^2$.

10. A method of producing a printed matter having a luster of gold, comprising steps of:
    (A) providing a toner comprising a powder containing at least one thiophene polymer;
    (B) loading the toner onto a base material in a state in which the toner is not mixed with solvents or other materials or substances; and
    (C) pressurizing the toner against the base member whereupon the luster of gold is generated on a surface of the printed matter, wherein
    in step (C), the powder is rubbed by a pressing member generating a resultant force of a first pressure force having a direction substantially perpendicular to a surface of the powder and a second pressure force having a direction substantially parallel to the surface of the powder.

* * * * *